United States Patent
Chung et al.

(10) Patent No.: US 11,956,843 B2
(45) Date of Patent: Apr. 9, 2024

(54) ELECTRONIC DEVICE SUPPORTING ADDITION OF SECONDARY NODE, AND METHOD THEREFOR

(71) Applicant: Samsung Electronics Co., Ltd., Gyeonggi-do (KR)

(72) Inventors: Wonsuk Chung, Gyeonggi-do (KR); Jihwan Kim, Gyeonggi-do (KR); Soomin Lee, Gyeonggi-do (KR); Taeseop Lee, Gyeonggi-do (KR); Jiyoung Cha, Gyeonggi-do (KR); Hyejeong Kim, Gyeonggi-do (KR); Sangho Lee, Gyeonggi-do (KR); Suyoung Park, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 425 days.

(21) Appl. No.: 17/299,856

(22) PCT Filed: Oct. 17, 2019

(86) PCT No.: PCT/KR2019/013668
§ 371 (c)(1),
(2) Date: Jun. 4, 2021

(87) PCT Pub. No.: WO2020/122402
PCT Pub. Date: Jun. 18, 2020

(65) Prior Publication Data
US 2022/0117021 A1    Apr. 14, 2022

(30) Foreign Application Priority Data

Dec. 14, 2018 (KR) .................... 10-2018-0162414

(51) Int. Cl.
*H04W 76/16* (2018.01)
*H04W 24/10* (2009.01)
(Continued)

(52) U.S. Cl.
CPC .......... *H04W 76/16* (2018.02); *H04W 24/10* (2013.01); *H04W 48/20* (2013.01); *H04W 56/001* (2013.01); *H04W 76/18* (2018.02)

(58) Field of Classification Search
CPC ... H04W 24/10; H04W 48/20; H04W 56/001; H04W 76/16; H04W 76/18; H04W 76/19; H04W 88/06
See application file for complete search history.

(56) References Cited

U.S. PATENT DOCUMENTS 9,439,233 B2    9/2016 Kwon
9,907,110 B2    2/2018 Susitaival et al.
(Continued)

FOREIGN PATENT DOCUMENTS

KR    10-2015-0035358 A    4/2015
KR    10-2018-0108150 A    10/2018
WO    2018/203710 A1    11/2018

OTHER PUBLICATIONS

Intel Corporation; "Combined HO with SCG chang"; R2-1803935; 3GPP TSG-RAN WG2 Meeting ; #101; Athens, Greece, Mar. 2, 2018.
(Continued)

*Primary Examiner* — Kashif Siddiqui
(74) *Attorney, Agent, or Firm* — Cha & Reiter, LLC

(57) ABSTRACT

Disclosed according to various embodiments is an electronic device comprising: a first communication circuit configured to provide first wireless communication within a first frequency range; a second communication circuit configured to provide second wireless communication within a second frequency range; a processor operably connected to the first communication circuit and the second communication circuit; and a memory operably connected to the processor, wherein the memory has instructions stored therein which cause, when executed, the processor to: establish a channel for communication with a first base station, by using the first communication circuit; receive, from the first base station, a first message containing information about at least one frequency at which to assess a communication status by
(Continued)

using the second communication circuit; assess statuses for communication with one or more second base stations, by using the second communication circuit on the basis of the first message; transmit a second message concerning the one or more second base stations to the first base station on the basis of results obtained by the assessment; receive, from the first base station, a third message containing information about a selected second base station and timer information on the basis of the second message; start a timer on the basis of the timer information and then, by using the second communication circuit, assess a status for communication with the selected second base station on the basis of a signal received from the selected second base station; and transmit a fourth message containing information about the selected second base station to the first base station before the end of the timer on the basis of results obtained by the assessment. Various other embodiments found through the specification are also possible.

14 Claims, 12 Drawing Sheets

(51) Int. Cl.
*H04W 48/20* (2009.01)
*H04W 56/00* (2009.01)
*H04W 76/18* (2018.01)

(56) References Cited

U.S. PATENT DOCUMENTS

| | | | |
|---|---|---|---|
| 9,980,159 B2 | 5/2018 | Tseng | |
| 10,015,805 B2 | 7/2018 | Zhang et al. | |
| 10,015,807 B2 | 7/2018 | Heo et al. | |
| 10,028,328 B2 | 7/2018 | Kwon | |
| 10,075,966 B2 | 9/2018 | Zitzmann et al. | |
| 10,136,447 B2 | 11/2018 | Chatterjee et al. | |
| 10,142,999 B2 | 11/2018 | Panteleev et al. | |
| 10,271,373 B2 | 4/2019 | Susitaival et al. | |
| 10,397,975 B2 | 8/2019 | Kwon | |
| 10,524,149 B2 * | 12/2019 | Jung | H04W 24/10 |
| 10,813,162 B2 | 10/2020 | Susitaival et al. | |
| 11,082,874 B2 | 8/2021 | Kim et al. | |
| 11,553,365 B2 | 1/2023 | Kim et al. | |
| 2015/0092707 A1 | 4/2015 | Kwon | |
| 2016/0095004 A1 | 3/2016 | Tseng | |
| 2016/0302256 A1 | 10/2016 | Susitaival et al. | |
| 2016/0338139 A1 | 11/2016 | Kwon | |
| 2017/0171771 A1 * | 6/2017 | Jung | H04W 24/10 |
| 2017/0273095 A1 | 9/2017 | Heo et al. | |
| 2018/0184482 A1 | 6/2018 | Susitaival et al. | |
| 2019/0254096 A1 * | 8/2019 | Wu | H04W 36/0069 |
| 2019/0320358 A1 * | 10/2019 | Knapp | H04W 52/0241 |
| 2020/0029237 A1 | 1/2020 | Kim et al. | |
| 2020/0162953 A1 * | 5/2020 | Kim | H04L 5/0051 |
| 2021/0014714 A1 | 1/2021 | Kim et al. | |
| 2021/0068182 A1 * | 3/2021 | He | H04W 16/14 |
| 2021/0153281 A1 | 5/2021 | Deogun et al. | |
| 2021/0368378 A1 | 11/2021 | Kim et al. | |
| 2021/0410216 A1 * | 12/2021 | Liu | H04W 76/20 |

OTHER PUBLICATIONS

ZTE; Clarifications on SgNB initiated SgNB Modification procedure; R3-181464; 3GPP TSG-RAN WG3 Meeting #99; Athens, Greece, Mar. 2, 2018.
Korean Office Action dated Jan. 2, 2024.
Rapporteur (ZTE Corporation), R2-1819036, Agreements for MR-DC with 5GC, 3GPP TSG RAN WG2 #104, 3GPP, Nov. 27, 2018.

* cited by examiner

ELECTRONIC DEVICE SUPPORTING ADDITION OF SECONDARY NODE, AND METHOD THEREFOR

CROSS-REFERENCE TO RELATED APPLICATION(S)

This application is a National Phase Entry of PCT International Application No. PCT/KR2019/013668, which was filed on Oct. 17, 2019, and claims priority to Korean Patent Application No. 10-2018-0162414, which was filed on Dec. 14, 2018, the contents of which are incorporated herein by reference.

TECHNICAL FIELD

Various embodiments disclosed in the disclosure relate to an electronic device supporting addition of a secondary node and a method for addition of a secondary node.

BACKGROUND ART

An electronic device may be connected to a base station having at least one cell to perform wireless communication. The electronic device may be connected with the base station by performing an attach procedure. The electronic device may be connected with the base station in the cell to perform wireless communication.

The electronic device may be connected with base stations which provide wireless communication using two different frequency bands. To be connected with base stations over different frequency bands, the electronic device may support multi-connectivity (e.g., dual connectivity). The electronic device may be connected with a base station of a cell having a communication state meeting a specified condition among base stations which use a signal of the corresponding frequency band.

DISCLOSURE

Technical Problem

An electronic device supporting multi-connectivity may receive information about a second base station from the connected first base station to be connected to the second base station. The information about the second base station may vary with movement of the electronic device or a communication state with the second base station, and the electronic device may fail in an operation of being additionally connected with the selected second base station.

The electronic device may measure a communication state with the second base station based on timer information. When the operation of adding the second base station fails until the timer expires, the electronic device may transmit information that it fails to the first base station. Although the electronic device moves or the communication state with the second base station changes, as the electronic device performs the operation of additionally connecting with the second base station again until the timer expires, transmitting the information that the operation of adding the second base station fails to the first base station may be delayed.

Various embodiments disclosed in the disclosure may provide a method for transmitting information that an operation of adding a second base station fails to a first base station without delay in an electronic device.

Technical Solution

In accordance with an aspect of the disclosure, an electronic device is provided. The electronic device may include a first communication circuitry configured to provide first wireless communication using a first frequency range, a second communication circuitry configured to provide second wireless communication using a second frequency range, a processor operatively connected with the first communication circuitry and the second communication circuitry, and a memory operatively connected with the processor. The memory may store instructions, when executed, causing the processor to establish a communication channel with a first base station, using the first communication circuitry, receive a first message including at least one frequency information to measure a communication state using the second communication circuitry, from the first base station, measure a communication state with at least one second base station, using the second communication circuitry based on the first message, transmit a second message about the at least one second base station to the first base station, based on the measured result, receive a third message including information about a selected second base station and timer information, based on the second message from the first base station, start to run a timer based on the timer information and measure a channel state with the selected second base station, based on a signal received from the selected second base station, using the second communication circuitry, and transmit a fourth message including the information of the selected second base station to the first base station, before the timer expires, based on the measured result.

In accordance with another aspect of the disclosure, an electronic device is provided. The electronic device may include a first communication circuitry configured to provide first wireless communication using a first frequency range, a second communication circuitry configured to provide second wireless communication using a second frequency range, a processor operatively connected with the first communication circuitry and the second communication circuitry, and a memory operatively connected with the processor. The memory may store instructions, when executed, causing the processor to establish a communication channel with a first base station, using the first communication circuitry, receive a secondary node addition configuration message including information about a second base station to be requested to be added by the first base station and timer information from the first base station, start to run a timer based on the timer information and measure a communication state with the second base station, based on a signal received from the second base station, using the second communication circuitry, and compare the measured result with the secondary node addition configuration message and transmit a secondary node addition failure message including information that it fails to add the second base station to the first base station, using the first communication circuitry, before the timer expires.

In accordance with another aspect of the disclosure, an operation method is provided. The operation method may include establishing a communication channel with a first base station, using a first communication circuitry configured to provide first wireless communication using a first frequency range, receiving a first message including at least one frequency information to measure a communication state using a second communication circuitry, from the first base station, measuring a communication state with at least one second base station, using the second communication circuitry configured to provide second wireless communication using a second frequency range based on the first message, transmitting a second message about the at least one second base station to the first base station, based on the measured result, receiving a third message including information about a selected second base station and timer information, based on the second message from the first base station, starting to run a timer based on the timer information and measuring a communication state with the selected second base station, based on a signal received from the selected second base station, using the second communication circuitry, and transmitting a fourth message including the information of the selected second base station to the first base station, before the timer expires, based on the measured result.

Advantageous Effects

According to various embodiments disclosed in the disclosure, the electronic device may transmit information that the operation of adding the second base station fails to the first base station without delay, thus quickly notifying the first base station of the fact that the operation of adding the second fails.

Furthermore, according to various embodiments disclosed in the disclosure, although it fails to connect to the second base station, the electronic device may be quickly connected with another base station meeting a communication state.

In addition, various effects ascertained directly or indirectly through the disclosure may be provided.

With regard to description of drawings, the same or similar denotations may be used for the same or similar components.

MODE FOR INVENTION

Hereinafter, various embodiments of the disclosure may be described with reference to accompanying drawings. However, it should be understood that this is not intended to limit the present disclosure to specific implementation forms and includes various modifications, equivalents, and/or alternatives of embodiments of the present disclosure.

Figure 1:
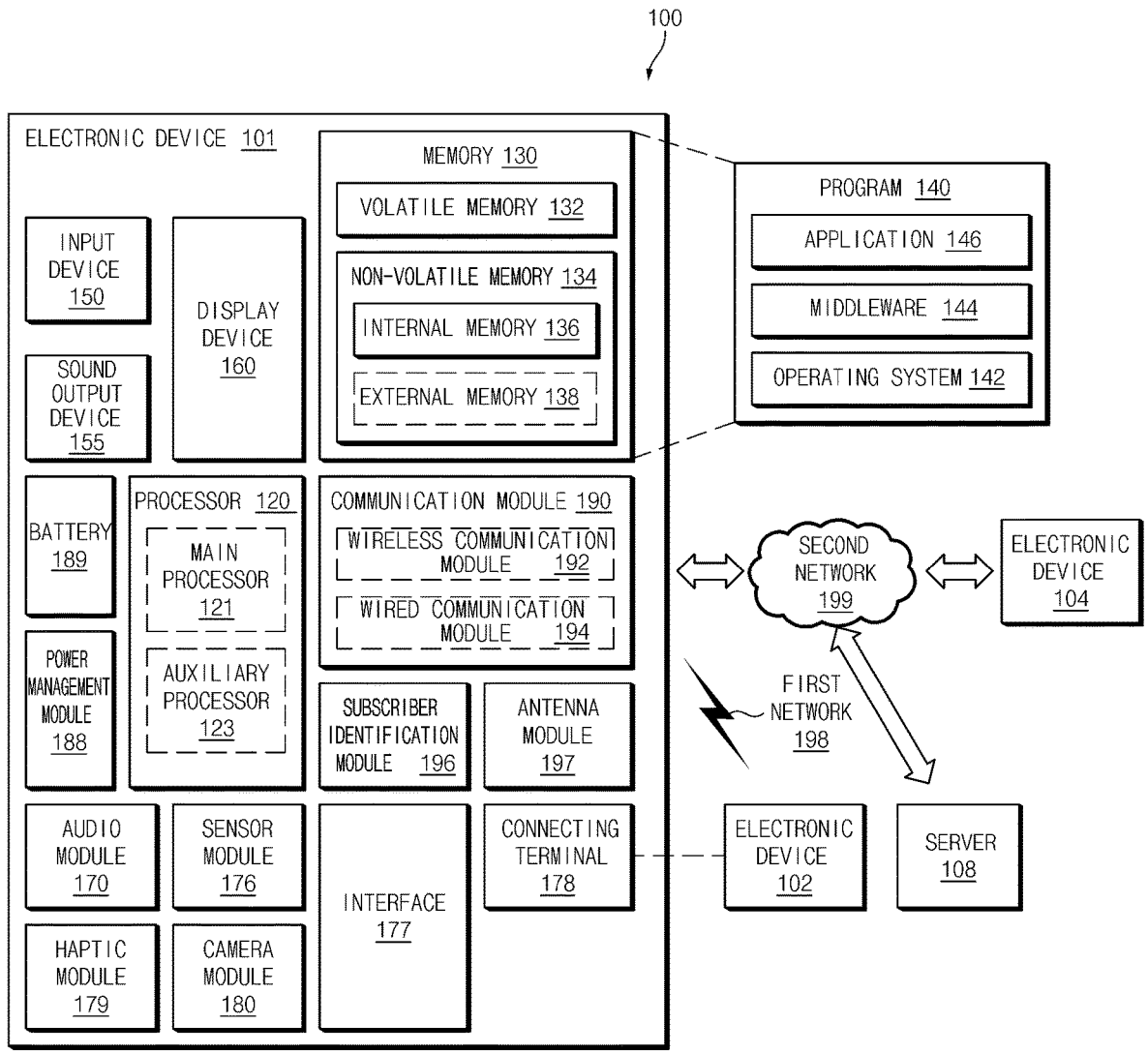
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SPA) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
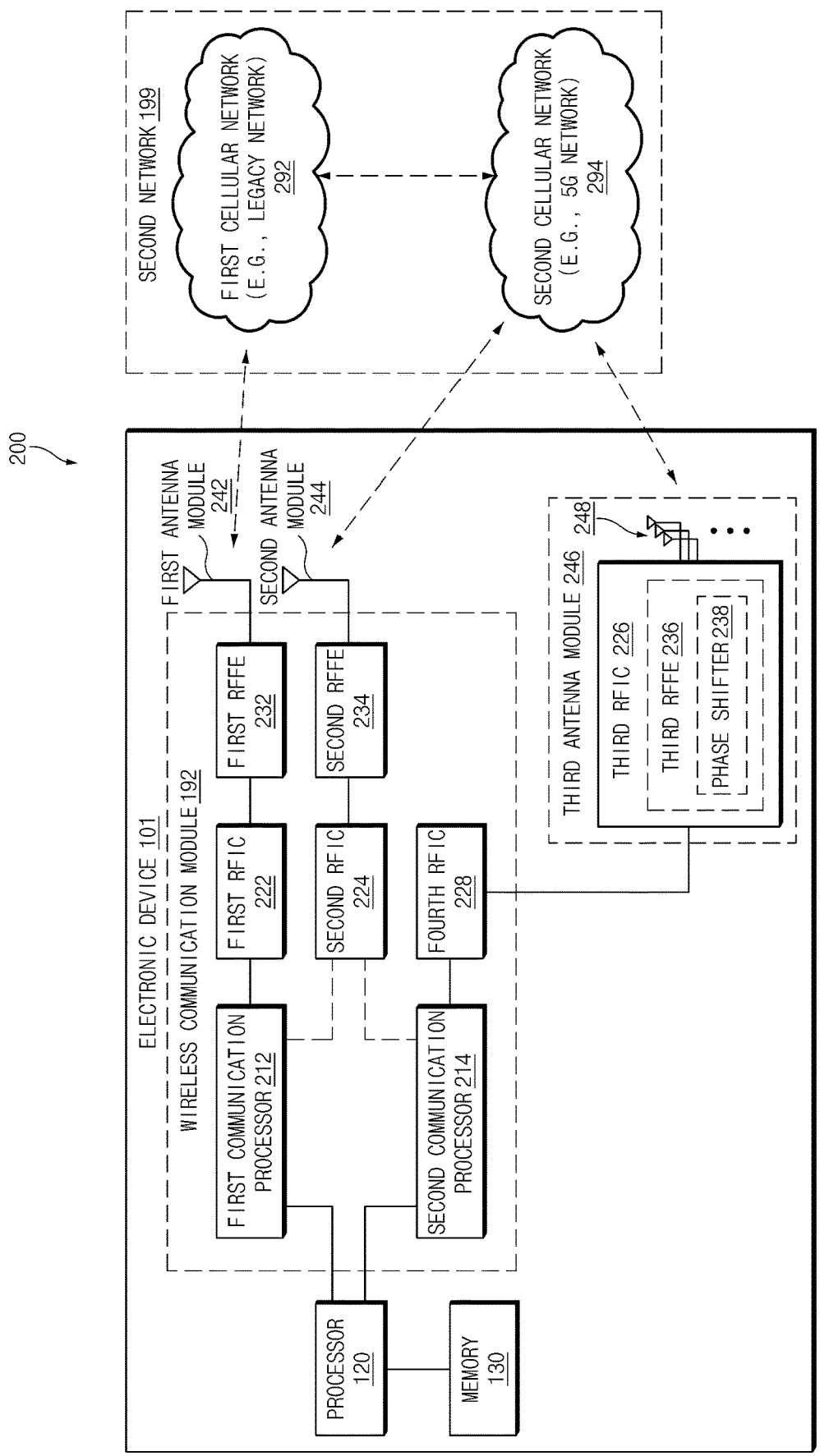
FIG. 2 is a block diagram of an electronic device for supporting legacy network communication and 5G network communication according to various embodiments.

FIG. 2 is a block diagram 200 of an electronic device 101 for supporting legacy network communication and 5G network communication according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network 199 may include a first network 292 and a second network 294. According to another embodiment, the electronic device 101 may further include at least one of the components shown in FIG. 1. The network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of a wireless communication module 192. According to another embodiment, the fourth RFIC 228 may be omitted or may be included as a part of the third RFIC 226.

The first communication processor 212 may establish a communication channel of a band to be used for wireless communication with the first network 292 and may support legacy network communication over the established communication channel. According to various embodiments, the first network 292 may be a legacy network including 2nd generation (2G), 3G, 4G, or long term evolution (LTE) network. The second communication processor 214 may establish a communication channel corresponding to a specified band (e.g., about 6 GHz to about 60 GHz) among bands to be used for wireless communication with the second network 294 and may support 5G network communication over the established communication channel. According to various embodiments, the second network 294 may be a 5G network defined in 3GPP. In addition, according to an embodiment, the first communication processor 212 or the second communication processor 214 may establish a communication channel corresponding to another specified band (e.g., about 6 GHz or less) among bands used for wireless communication with the second network 294 and may support 5G network communication over the established communication channel. According to an embodiment, the first communication processor 212 and the second communication processor 214 may be implemented in a single chip or a single package. According to various embodiments, the first communication processor 212 or the second communication processor 214 may be configured with the processor 120, an auxiliary processor 123, or a communication module 190 in a single chip or a single package.

Upon transmission, the first RFIC 222 may convert a baseband signal generated by the first communication processor 212 into a radio frequency (RF) signal of about 700 MHz to about 3 GHz used for the first network 292 (e.g., the legacy network). Upon reception, an RF signal may be obtained from the first network 292 (e.g., the legacy network) via an antenna (e.g., the first antenna module 242) and may be preprocessed via an RFFE (e.g., the first RFFE 232). The first RFIC 222 may convert the preprocessed RF signal into a baseband signal to be able to be processed by the first communication processor 212.

Upon transmission, the second RFIC 224 may convert a baseband signal generated by the first communication processor 212 or the second communication processor 214 into an RF signal of a Sub6 band (e.g., about 6 GHz or less) (hereinafter referred to as "5G Sub6 RF signal") used for the second network 294 (e.g., the 5G network). Upon reception, a 5G Sub6 RF signal may be obtained from the second network 294 (e.g., the 5G network) via an antenna (e.g., the second antenna module 244) and may be preprocessed via an RFFE (e.g., the second RFFE 234). The second RFIC 224 may convert the preprocessed 5G Sub6 RF signal into a baseband signal to be able to be processed by a corresponding communication processor between the communication processor 212 or the second communication processor 214.

The third RFIC 226 may convert a baseband signal generated by the second communication processor 214 into an RF signal of a 5G Above6 band (e.g., about 6 GHz to about 60 GHz) (hereinafter referred to as "5G Above6 RF signal") to be used in the second network 294 (e.g., the 5G network). Upon reception, a 5G Above6 RF signal may be obtained from the second network 294 (e.g., the 5G network) via an antenna (e.g., the antenna 248) and may be preprocessed via the third RFFE 236. The third RFIC 226 may convert the preprocessed 5G Above6 RF signal into a baseband signal to be able to be processed by the second communication processor 214. According to an embodiment, the third RFFE 236 may be configured as a part of the third RFIC 226.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal of an intermediate frequency band (e.g., about 9 GHz to about 11 GHz) (hereinafter referred to as "IF signal") and may delivery the IF signal to the third RFIC 226. The third RFIC 226 may convert the IF signal into a 5G Above6 RF signal. Upon reception, a 5G Above6 RF signal may be received from the second network 294 (e.g., the 5G network) via an antenna (e.g., the antenna 248) and may be converted into an IF signal by the third RFIC 226. The fourth RFIC 228 may convert the IF signal into a baseband signal to be able to be processed by the second communication processor 214.

According to an embodiment, the RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one of the first antenna module 242 or the second antenna module 244 may be omitted or may be combined with another antenna module to process RF signals of a plurality of corresponding bands.

According to an embodiment, the third RFIC 226 and the antenna 248 may be arranged on the same substrate to configure the third antenna module 246. For example, the wireless communication module 192 or the processor 120 may be arranged on a first substrate (e.g., a main PCB). In this case, as the third RFIC 226 is disposed on a partial region (e.g., a lower surface) of a second substrate (e.g., a sub-PCB) independent of the first substrate and as the antenna 248 is disposed on another partial region (e.g., an upper surface), the third antenna module 246 may be configured. According to an embodiment, the antenna 248 may include, for example, an antenna array which may be used for beamforming. As the third RFIC 226 and the antenna 248 are arranged on the same substrate, it is possible to reduce a length of a transmission line between the third RFIC 226 and the antenna 248. For example, this may reduce that, for example, a signal of a high frequency band (e.g., about 6 GHz to about 60 GHz) used for 5G network communication is lost (e.g., attenuated) by the transmission line. Due to this, the electronic device 101 may enhance quality or speed of communication with the second network 294 (e.g., the 5G network).

The second cellular network 294 (e.g., the 5G network) may be operated independently of the first network 292 (e.g., the legacy network) (e.g., stand-alone (SA)) or may be connected and operated with the first network 292 (e.g., the legacy network) (e.g., non-standalone (NSA)). For example, there may be only an access network (e.g., a 5G radio access network (RAN) or a next generation RAN (NG RAN)) in the 5G network and there may be no core network (e.g., next generation core (NGC)) in the 5G network. In this case, the electronic device 101 may access the access network of the 5G network and may then access an external network (e.g., the Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130 and may be accessed by another component (e.g., the processor 120, the first communication processor 212, or the second communication processor 214).

Figure 3A:
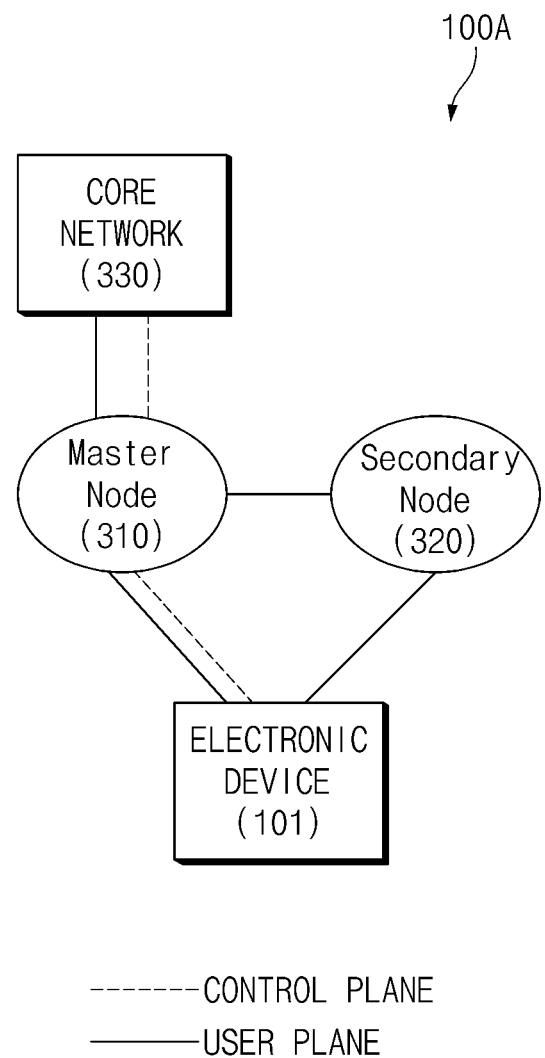
FIGS. 3A to 3C are drawings illustrating wireless communication systems for providing a network of legacy communication and/or 5G communication according to various embodiments.
Figure 3B:
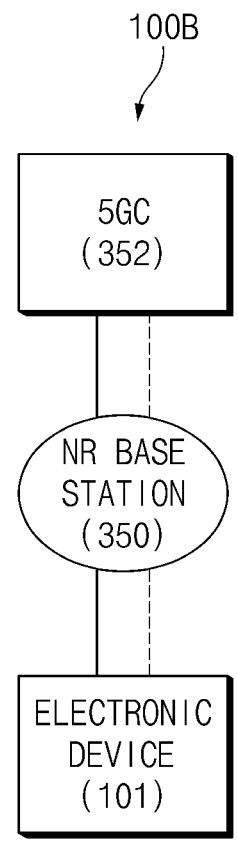
Figure 3C:
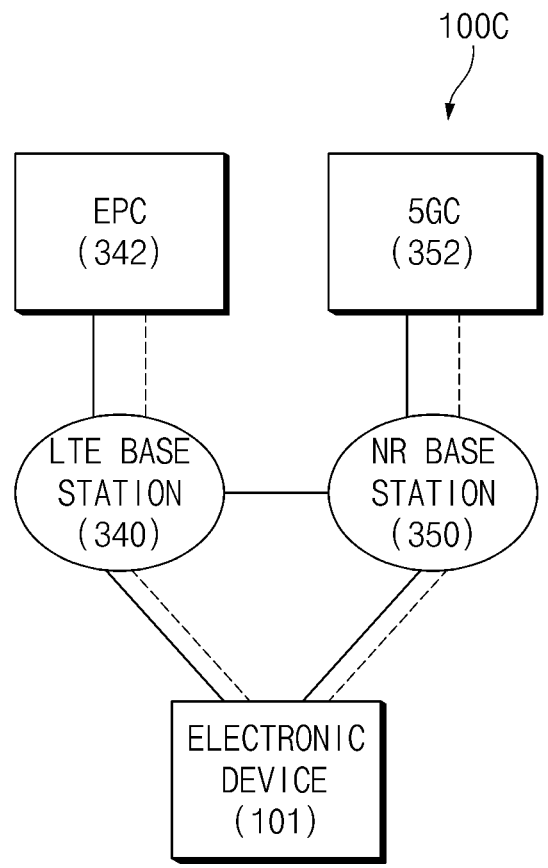

FIGS. 3A to 3C are drawings illustrating wireless communication systems for providing a network of legacy communication and/or 5G communication according to various embodiments. Referring to FIGS. 3A to 3C, network environments 1000A to 1000C may include at least one of a legacy network and a 5G network. The legacy network may include, for example, a 4G or LTE base station 340 (e.g., an eNodeB (eNB)) of the 3GPP standard for supporting radio access to an electronic device 101 and an evolved packet core (EPC) 342 for managing 4G communication. The 5G network may include, for example, a new radio (NR) base station 350 (e.g., a gNodeB (gNB)) for supporting radio access to the electronic device 101 and a 5th generation core (5GC) 352 for managing 5G communication of the electronic device 101.

According to various embodiments, the electronic device 101 may transmit and receive a control message and user data through the legacy communication and/or 5G communication. The control message may include, for example, a message associated with at least one of security control, bearer setup, authentication, registration, or mobility management of the electronic device 101. The user data may refer to, for example, user data except for a control message transmitted and received between the electronic device 101 and a core network 330 (e.g., an EPC 342).

Referring to FIG. 3A, the electronic device 101 according to an embodiment may transmit and receive at least one of a control message or user data with at least a portion (e.g., the NR base station 350 or the 5GC 352) of the 5G network using at least a portion (e.g., the LTE base station 340 or the EPC 342) of the legacy network.

According to various embodiments, the network environment 100A may include a network environment which provides multi-radio access technology (RAT) dual connectivity (MR-DC) to the LTE base station 340 and the NR base station 350 and transmits and receives a control message with the electronic device 101 over the one core network 330 between the EPC 342 or the 5GC 352.

According to various embodiments, in an MR-DC environment, one of the LTE base station 340 or the NR base station 350 may operate as a master node (MN) 310 and the other may operate as a secondary node (SN) 320. The MN 310 may be connected to the core network 330 to transmit and receive a control message. The MN 310 and the SN 320 may be connected through a network interface and may transmit and receive a message associated with managing a radio resource (e.g. a communication channel).

According to various embodiments, the MN 310 may be configured as the LTE base station 340, the SN 320 may be configured as the NR base station 350, and the core network 300 may be configured as the EPC 342. For example, a control message may be transmitted and received via the LTE base station 340 and the EPC 342 and user data may be transmitted and received via the LTE base station 3450 and the NR base station 350.

Referring to FIG. 3B, according to various embodiments, the 5G network may transmit and receive a control message and user data independently of the electronic device 101.

Referring to FIG. 3C, the legacy network and the 5G network according to various embodiments may transmit and receive data independently of each other. For example, the electronic device 101 and the EPC 342 may transmit and receive a control message and user data via the LTE base station 340. For another example, the electronic device 101 and the 5GC 352 may transmit and receive a control message and user data via the NR base station 350.

According to various embodiments, the electronic device 101 may be registered with at least one of the EPC 342 or the 5GC 352 to transmit and receive a control message.

According to various embodiments, the EPC 342 or the 5GC 352 may interwork to manage communication of the electronic device 101. For example, movement information of the electronic device 101 may be transmitted and received via an interface between the EPC 342 and the 5GC 352.

Figure 4:
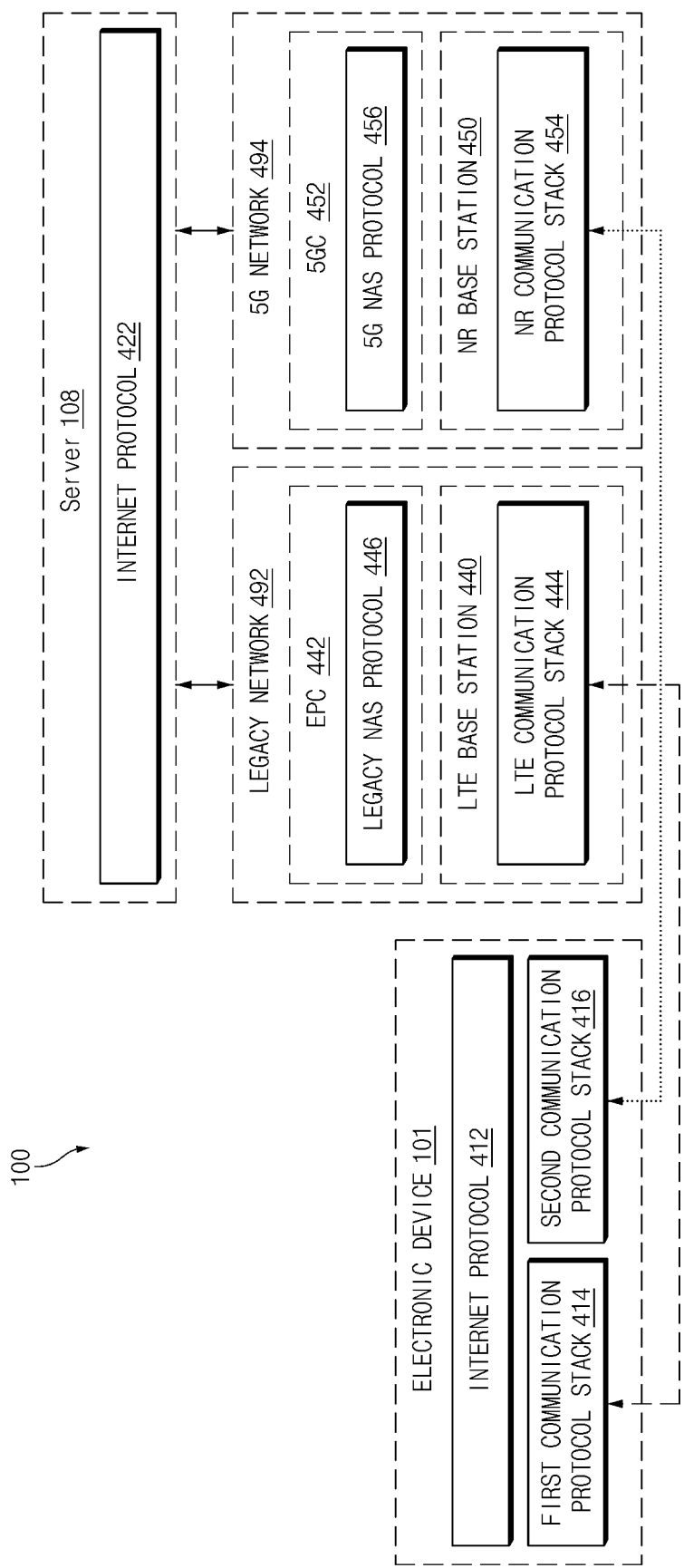
FIG. 4 is a drawing illustrating a protocol stack structure of a network of legacy communication and/or 5G communication according to an embodiment.

FIG. 4 is a drawing illustrating a protocol stack structure of a network 100 of legacy communication and/or 5G communication according to an embodiment. According to the shown embodiment, a network 100 may include an electronic device 101, a server 108, a legacy network 492, and a 5G network 494.

The electronic device 101 may include an Internet protocol 412, a first communication protocol stack 414, and a second communication protocol stack 416. The electronic device 101 may communicate with the server 108 over the legacy network 492 and/or the 5G network 494.

According to an embodiment, the electronic device 101 may perform Internet communication associated with the server 108 using the Internet protocol 412 (e.g., a TCP, a UDP, or an IP). The Internet protocol 412 may be executed in, for example, a main processor (e.g., a main processor 121 of FIG. 1) included in the electronic device 101.

According to another embodiment, the electronic device 101 may perform wireless communication with the legacy network 492 using the first communication protocol stack 414. According to another embodiment, the electronic device 101 may perform wireless communication with the 5G network 494 using the second communication protocol stack 416. The first communication protocol stack 414 and the second communication protocol stack 416 may be executed in, for example, one or more communication processors (e.g., a wireless communication module 192 of FIG. 1) included in the electronic device 101.

The server 108 may include an Internet protocol 422. The server 108 may transmit and receive data associated with the Internet protocol 422 with the electronic device 101 over the legacy network 492 and/or the 5G network 494. According to an embodiment, the server 108 may include a cloud computing server which is present outside the legacy network 492 or the 5G network 494. In another embodiment, the server 108 may include an edge computing server (or a mobile edge computing (MEC) server) located in at least one of the legacy network 492 or the 5G network 494.

The legacy network 492 may include an LTE base station 440 and an EPC 442. The LTE base station 440 may include an LTE communication protocol stack 444. The EPC 442 may include a legacy NAS protocol 446. The legacy network 492 may perform LTE wireless communication with the electronic device 101 using the LTE communication protocol stack 444 and the legacy NAS protocol 446.

The 5G network 494 may include an NR base station 450 and a 5GC 452. The NR base station 450 may include an NR communication protocol stack 454. The 5GC 452 may include a 5G NAS protocol 456. The 5G network 494 may perform NR wireless communication with the electronic device 101 using the NR communication protocol stack 454 and the 5G NAS protocol 456.

According to an embodiment, the first communication protocol stack 414, the second communication protocol stack 416, the LTE communication protocol stack 444, and the NR communication protocol stack 454 may include a control plane protocol for transmitting and receiving a control message and a user plane protocol for transmitting and receiving user data. The control message may include, for example, a message associated with at least one of security control, bearer setup, authentication, registration, or mobility management. The user data may include, for example, the other data except for the control message.

According to an embodiment, the control plane protocol and the user plane protocol may include physical (PHY), medium access control (MAC), radio link control (RLC), or packet data convergence protocol (PDCP) layers. The PHY layer may channel code and modulate data received from an upper layer (e.g., the MAC layer) to transmit it to a wireless channel and may demodulate and decode data received over the wireless channel to deliver it to the upper layer. The PHY layer included in the second communication protocol stack 416 and the NR communication protocol stack 454 may further perform an operation associated with beamforming. The MAC layer may be logically/physically mapped to, for example, a wireless channel to transmit and receive data and may perform a hybrid automatic repeat request (HARQ) for error correction. The RLC layer may perform, for example, concatenation, segmentation, or reassembly of data and may perform sequence detection, reordering, or duplicate detection of data. The PDCP layer may perform, for example, an operation associated with ciphering and data integrity of control data and user data. The second communication protocol stack 416 and the NR communication protocol stack 454 may further include a service data adaptation protocol (SDAP). The SDAP may manage, for example, radio bearer allocation based on a quality of service (QoS) of user data.

According to various embodiments, the control plane protocol may include a radio resource control (RRC) layer and a non-access stratum (NAS) layer. The RRC layer may process, for example, control data associated with radio bearer setup, paging, or mobility management. The NAS layer may process, for example, a control message associated with authentication, registration, or mobility management.

Figure 5:
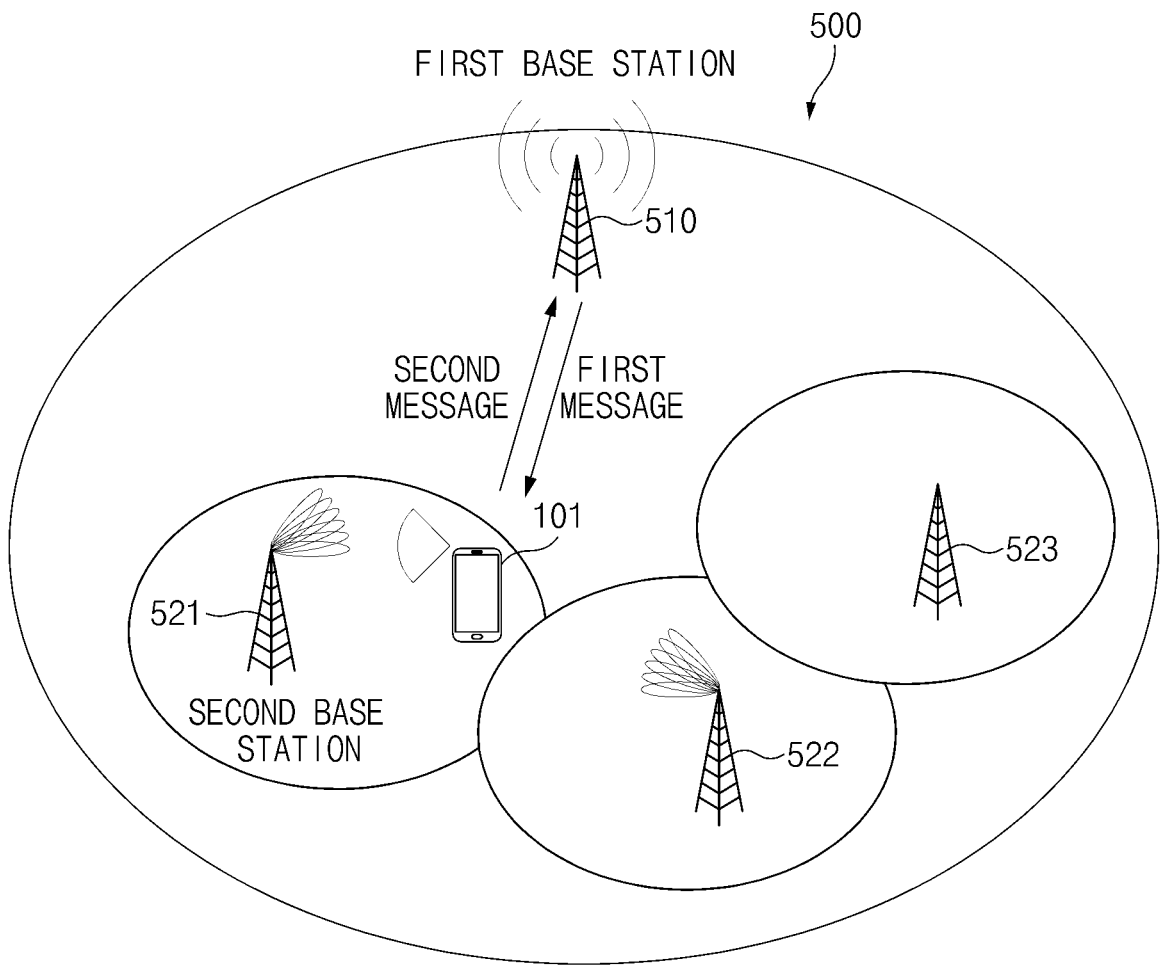
FIG. 5 is a drawing illustrating an operation of establishing a communication connection with a first base station and measuring a communication state of a second base station in an electronic device according to an embodiment.

FIG. 5 is a drawing 500 illustrating an operation of establishing a communication connection with a first base station 510 and measuring a communication state of a second base station 521, 522, or 523 in an electronic device 101 according to an embodiment.

In an embodiment, the electronic device 101 may perform wireless communication using different frequency ranges. For example, the electronic device 101 may perform wireless communication by using a first frequency band and a second frequency band different from the first frequency band at substantially the same time. According to an embodiment, the first frequency band and the second frequency band may correspond to different radio access technologies. For example, the electronic device 101 may simultaneously use the first frequency band corresponding to long term evolution (LTE) communication and the second frequency band corresponding to new radio (NR) communication. According to an embodiment, by using the second frequency band which is the same as the first frequency band, the electronic device 101 may respond to different radio access technologies. For example, the electronic device 101 may use the first frequency band corresponding to LTE communication and the second frequency band corresponding to NR communication.

According to an embodiment, the electronic device 101 may support dual connectivity. The electronic device 101 supporting the dual connectivity may establish a communication connection with a first base station 510 and/or at least one second base station 521, 522, or 523. The first base station 510 may provide first wireless communication with the electronic device 101 using a first frequency range. The at least one second base station 521, 522, or 523 may provide second wireless communication with the electronic device 101 using a second frequency range. In an embodiment, the first frequency range and the second frequency range may be at least partially overlapped. In another embodiment, the first frequency range and the second frequency range may fail to be overlapped. For example, the radio access technology of the first base station 510 and the radio access technology of the second base station 521, 522, or 523 may differ from each other. For example, the radio access technology of the first base station 510 and the radio access technology of the second base station 521, 522, or 523 may be the same as each other.

In an embodiment, each of the first base station 510 and at least one second base station 521, 522, or 523 may be associated with at least one cell indicating a range where wireless communication is possible. For example, as shown in FIG. 5, when the electronic device 101 enters a coverage of a cell associated with the first base station 510 and/or the one second base station 521, it may be connected with the first base station 510 and/or the second base station 521. Coverages of cells associated with the first base station 510 and the at least one second base station 521, 522, or 523 may differ from each other. For example, the first base station 510 may be associated with a cell having a wider coverage than the second base station 521, 522, or 523.

In an embodiment, the first base station 510 may be a master node. For example, the first base station 510 may support at least 4G or LTE communication. For another example, the first base station 510 may further support 5G or NR communication. In an embodiment, the second base station 521, 522, or 523 may be included in a secondary node (SN). For example, the second base station 521, 522, or 523 may support 5G or NR communication. For another example, the second base station 521, 522, or 523 may support 4G or LTE communication.

In an embodiment, a processor 120 of the electronic device 101 may operate according to the 3rd generation partnership project (3GPP) standard. The electronic device 101 may establish a communication channel with the first base station 510. To set a secondary node (e.g., the second base station 521) to be added to the electronic device 101, the first base station 510 may perform a control operation between the electronic device 101 and the base station over a channel established as a master node. To set the secondary node, the first base station 510 and the second base station 521 may communicate with each other.

In an embodiment, the electronic device 101 may receive a first message from the first base station 510. The first message may be a control signal causing the electronic device 101 to measure a communication state for a secondary node. For example, the secondary node may include information about the at least one second base station 521, 522, or 523. The first message may include at least one frequency information to perform communication state measurement. For example, the first message may include a radio resource control (RRC) connection reconfiguration message. The first message may include information necessary to transmit the measured communication state result to the first base station 510. For example, the first message may include a measurement report configuration message.

In an embodiment, the electronic device 101 may measure signal quality of the at least one second base station 521, 522, or 523 associated with the secondary node based on the first message. The electronic device 101 may measure signal quality using at least one measurement object (MO) for a cell associated with the second base station 521, 522, or 523. For example, the MO may be a synchronization signal or a reference signal corresponding to each beam received from the at least one second base station 521, 522, or 523. The electronic device 101 may measure signal quality based on a reference signal received power (RSRP) of the synchronization signal or the reference signal received from the second base station 521, 522, or 523. The electronic device 101 may measure a communication state of each of the at least one second base station 521, 522, or 523 using the MO. For example, the electronic device 101 may construct a database (e.g., a table) associated with the synchronization signal, the reference signal, or the RSRP.

In an embodiment, the electronic device 101 may transmit a second message to the first base station 510. The electronic device 101 may transmit the second message about the at least one second base station 521, 522, or 523 to the first base station 510 based on the result of the signal quality measured using the MO. The second message may include information measuring signal quality of the at least one second base station 521, 522, or 523. For example, the second message may include a measurement report. The measurement report may include information about a communication state between the at least one second base station 521, 522, or 523 and the current electronic device 101. For example, the measurement report may include cell identifier information of the cell associated with the at least one second base station 521, 522, or 523.

In an embodiment, the first base station 510 may select the second base station 521, 522, or 523 to request to be added to the electronic device 101 based on the second message. For example, the first base station 510 may select the second base station 521 to request to be added according to information about the second base station 521, which is included in the second message. For example, the first base station 510 may select a frequency band in which the second base station 521 operates. The first base station 510 may transmit an add request to the second base station 521 and may receive a response to the add request from the second base station 521.

Figure 6:
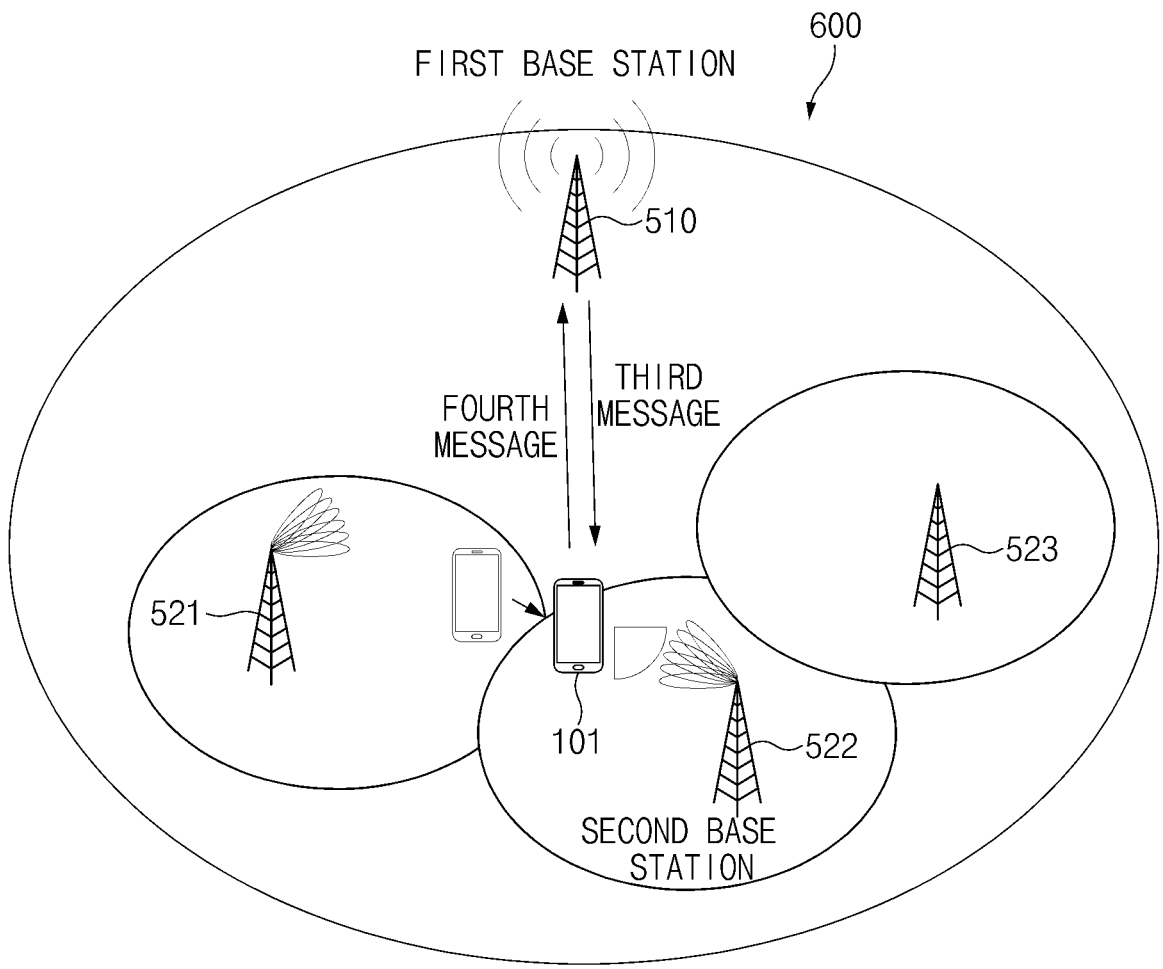
FIG. 6 is a drawing illustrating an operation of transmitting a result of adding a second base station to a first base station in an electronic device according to an embodiment.

FIG. 6 is a drawing 600 illustrating an operation of transmitting a result of adding a second base station 521, 522, or 523 to a first base station 510 in an electronic device 101 according to an embodiment.

In an embodiment, the electronic device 101 may receive a third message including information about the selected second base station 521 and timer information from the first base station 510. The information about the selected second base station 521 may include a request to additionally connect the selected second base station 521 to the electronic device 101. For example, the third message may include a secondary node addition configuration message. The third message may include access configuration information about the selected second base station 521, which is information causing the electronic device 101 to access the selected second base station 521. For example, the third message may include radio bearer configuration information, cell group identifier information, cell group configuration information, and/or timer information associated with radio link failure.

In an embodiment, when third message is received, the electronic device 101 may start to run a timer based on the timer information included in the third message. For example, the timer may have an expire time set based on timer information indicated by the third message. To add the selected second base station 521 before the timer expires, the electronic device 101 may measure a communication state with the selected second base station 521 based on the signal received from the second base station 521. For example, the timer information may refer to information of a time when the electronic device 101 attempts to add a secondary node or a time when the electronic device 101 is unable to declare a failure to add the secondary node.

In an embodiment, when performing the operation of adding the second base station 521 as the secondary node based on the information to access the second base station 521 included in the third message, the electronic device 101 may experience a failure to access the selected second base station 521. The electronic device 101 may experience a secondary node addition failure failing to additionally connect the secondary node. For example, when the electronic device 101 transmits a second message to move, information measuring a communication state with at least one second base station 521, 522, or 523 may fail to be valid. For another example, the first base station 510 may instruct to connect to the secondary node without the information measuring the communication state with the at least one second base station 521, 522, or 523. In this case, the first base station 510 may transmit the third message instructing to access a base station which is not suitable for performing dual connectivity with the electronic device 101. For another example, the first base station 510 may transmit the third message requesting the electronic device 101 to additionally connect with a secondary node (e.g., the second base station 523) which is not located in a cell coverage. In another embodiment, when failing to receive at least one of a synchronization signal and a reference signal of the secondary node (e.g., the second base station 521) instructed by the third message or when failing to decode at least one of the synchronization signal and the reference signal, the electronic device 101 may determine that it fails to access the instructed second base station 521.

In an embodiment, when the electronic device 101 adds the secondary node in a multi-connection environment, there may occur a significant latency or there may occur a phenomenon in which it does not succeed in connecting to a secondary node of a second frequency. For example, when the electronic device 101 is unable to connect with the selected secondary node, as the electronic device 101 is unable to declare an SN addition failure before the timer indicated by the third message expires, the connection with the secondary node may be delayed. Thus, to minimize the latency, the electronic device 101 may quickly transmit a report including the result of measuring the suitable second base station 521, 522, or 523 and may quickly transmit a radio resource control connection reconfiguration completion message.

In an embodiment, the electronic device 101 may measure a communication state with at least one third base station, using a second communication circuitry (e.g., a second communication circuitry 720 of FIG. 2), based on the measured result. When an SN addition failure occurs with respect to the second base station 521, 522, or 523, the electronic device 101 may additionally measure a communication state with the third base station different from the second base station which fails. When finding the third base station capable of being added as the secondary node, the electronic device 101 may transmit information associated with the third base station.

In an embodiment, when the SN addition failure occurs, the electronic device 101 may transmit a fourth message to the first base station 510, before the timer expires. For example, the fourth message transmitted to the first base station 510 by the electronic device 101 may include SN addition failure information. For example, as an embodiment, the SN additional failure information may include link measurement information about the second base station 521 which attempts to perform access. For another example, as an embodiment, the SN addition failure information may include link measurement information about a communication state and a frequency of the third base station 522 or 523 different from the second base station 521. The first base station 510 may select and transmit at least one of methods of repeatedly attempts to perform a task of adding the second base station 521 based on the fourth message, attempting to add at least one third base station 522 or 523 different from the second base station 521, or stopping all of an attempt to add a secondary node to the electronic device 101.

In an embodiment, the electronic device 101 may include the result of measuring a communication state of at least one third base station 522 or 523 in the fourth message. The electronic device 101 may transmit a list of third base stations discovered as being connectable to be added as the secondary node by the electronic device 101, the list being included in the fourth message, other than a secondary node list received from the first base station 510.

In an embodiment, the first base station 510 may receive the fourth message and may obtain information that there is at least one third base station 522 or 523 capable of being added as the secondary node. The first base station 510 may transmit information associated with one third base station (e.g., 522) selected based on the fourth message, the information being included in a fifth message, to the electronic device 101. The electronic device 101 may receive the fifth message including information of one third base station (e.g., 522) selected among the at least one third base station 522 or 523 from the first base station 510.

In an embodiment, the electronic device 101 may perform a communication connection with the selected one third base station (e.g., 522), using second communication circuitry 720, based on the fifth message. The electronic device 101 may add the selected one third base station (e.g., 522) as the secondary node using second communication circuitry 720.

Figure 7:
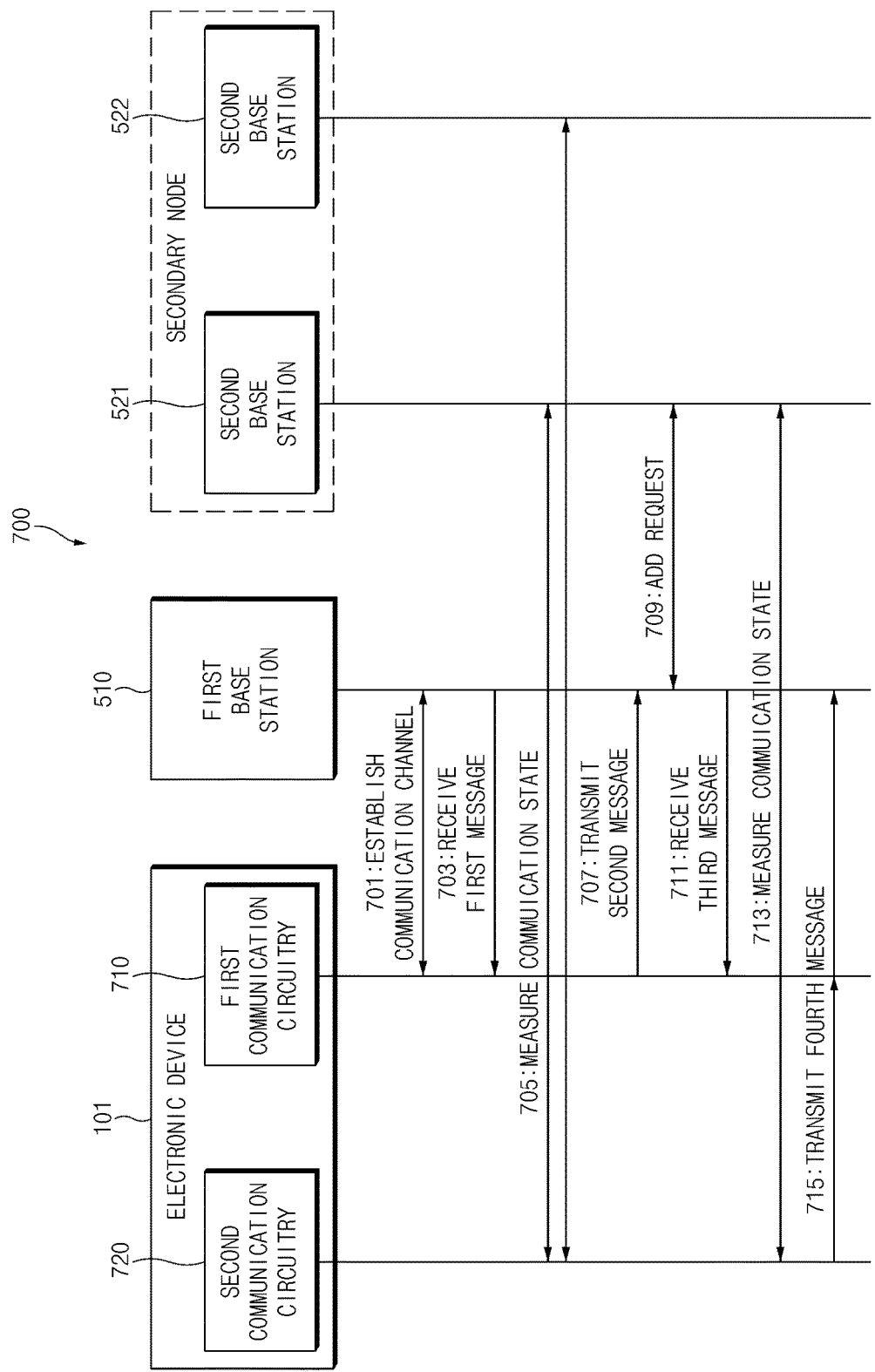
FIG. 7 is a signal sequence diagram illustrating operations of performing dual connectivity in an electronic device according to an embodiment.

FIG. 7 is a signal sequence diagram 700 illustrating an operation of performing dual connectivity in an electronic device 101 according to an embodiment. The operation of performing the dual connectivity described in FIG. 7 is applicable to when performing multi-connectivity.

According to an embodiment, the electronic device 101 may include first communication circuitry 710 and second communication circuitry 720. The first communication circuitry 710 may be configured to provide first wireless communication using a first frequency range. The second communication circuitry 720 may be configured to provide second wireless communication using a second frequency range.

In operation 701, the electronic device 101 according to an embodiment may establish a communication channel with a first base station 510 using the first communication circuitry 710. The electronic device 101 may complete access to the first base station 510.

In operation 703, the electronic device 101 according to an embodiment may receive a first message from the first base station 510. For example, the first message may include a radio resource control connection reconfiguration message.

In operation 705, the electronic device 101 according to an embodiment may measure signal quality of at least one secondary node (e.g., a second base station 521 or 522) using the second communication circuitry 720.

In operation 707, the electronic device 101 according to an embodiment may transmit a second message to the first base station 510 using the first communication circuitry 710. The electronic device 101 may generate the second message based on the measured signal quality result. For example, the second message may include a measurement report about at least one second base station 521 or 522.

In operation 709, the first base station 510 according to an embodiment may transmit and receive an add request with the selected second base station 521. The first base station 510 may select a secondary node to be additionally connected to the electronic device 101 among the at least one second base station 521 or 522 based on the second message. The first base station 510 may transmit a request to the selected second base station 521 to be the secondary node additionally connected with the electronic device 101. The first base station 510 may receive a response identifying whether it is able to function as the secondary node in response to the add request from the selected second base station 521.

In operation 711, the electronic device 101 according to an embodiment may receive a third message from the first base station 510 using the first communication circuitry 710. The third message may include information associated with the secondary node. The third message may include information about the second base station 521 selected among the at least one second base station 521 or 522 associated with the secondary node. For example, the third message may include a secondary node addition message.

In operation 713, the electronic device 101 according to an embodiment may measure channel states of surrounding base stations. As an embodiment, the electronic device 101 may measure a channel state for the second base station 521 included in the third message. As another embodiment, the electronic device 101 may measure a channel state for at least one or more base stations (e.g., the second base station 522) among base stations which are not included in the third message. The result of measuring the channel state of the based station in operation 713 may include a method for determining whether the first base station 510 transmits information for adding a suitable secondary node. For example, the electronic device 101 may determine whether the information about the second base station 521 selected among the at least one second base station 521 or 522 associated with the secondary node is appropriate. According to an embodiment, the electronic device 101 may perform measurement of at least one of a synchronization signal and a reference signal corresponding to a beam transmitted from the selected second base station 521 based on a setting value associated with the second base station 521 selected by the first base station 510. The electronic device 101 may measure reception quality of a beam received from the selected second base station 521 using the measurement of the at least one of the synchronization signal and the reference signal. The electronic device 101 may determine whether it is possible to add the selected second base station 521 based on the measured result. In an embodiment, the electronic device 101 may start to measure a communication state based on timer information included in the third message. For example, the timer may be a timer for accessing the selected second base station 521 among the secondary nodes. The electronic device 101 may continuously measure a communication state with the selected second base station 521 before the timer expires to identify a channel state.

In an embodiment, when there is no information about the secondary node or there is a change in the information about the secondary node, the first base station 510 may proceed with operation 713. For example, when signal quality information about the secondary node is not transmitted to the first base station 510, operation 713 may be performed. As another example, the first base station 510 may select the second base station 521 and may transmit information associated with the second base station 521, included in the third message, to the electronic device 101. However, when the state of the channel is sharply changed or it is expected to change the state of the channel as a result of the determination of the electronic device 101, or when the electronic device 101 moves, the first base station 510 may perform operation 713.

In an embodiment, the first base station 510 may select a secondary node which is inappropriate for being additionally connected to the electronic device 101. For example, when mobility of the electronic device 101 is greater than or equal to a specified range, when a change in a beam generated by the second base station 521 corresponding to the secondary node by an external environment such as a barrier is greater than or equal to a specified range, when the first base station 510 attempts to add a secondary node without measuring signal quality, when there is a delay over a certain time between a measurement report associated with the second base station 521 corresponding to the secondary node included in the second message and SN addition of the second base station 521, or when a beam direction of at least one of the synchronization signal and the reference signal of the second base station 521 instructed by the third message and a beam direction of the synchronization signal and the reference signal received in the electronic device 101 differ from each other, the selected second base station 521 may be inappropriate for being additionally connected to the electronic device 101. When the selected second base station 521 is inappropriate for being additionally connected to the electronic device 101, it may be late to add the secondary node or may fail to add the secondary node. The electronic device 101 may determine that there is a high probability of failure with regard to at least one or more of the conditions.

In operation 715, the electronic device 101 according to an embodiment may transmit a fourth message to the first base station 510. The fourth message may include secondary node addition failure information. For example, the electronic device 101 may fail in an operation of adding the second base station 521 as the secondary node via the second communication circuitry 720 and may generate a failure report (e.g., secondary node addition failure information) before the timer expires. The electronic device 101 may transmit the fourth message including the secondary node addition failure information to the first base station 510 via the first communication circuitry 710.

In an embodiment, the electronic device 101 may transmit the fourth message from the moment that a setting for the inappropriate secondary node is included in the third message, although the timer does not expire. The electronic device 101 may measure signal quality based on a setting value for the secondary node before transmitting the fourth message.

In an embodiment, after receiving the third message for adding the secondary node from the first base station 510, the electronic device 101 may transmit the fourth message without performing operation 713. For example, the electronic device 101 may compare a setting value associated with the selected second base station 521 included in the third message with a cell related value of the second base station 521 or 522 included in the electronic device 101 and may determine whether the setting value associated with the selected second base station 521 is a setting for the appropriate secondary node to transmit the fourth message.

Figure 8:
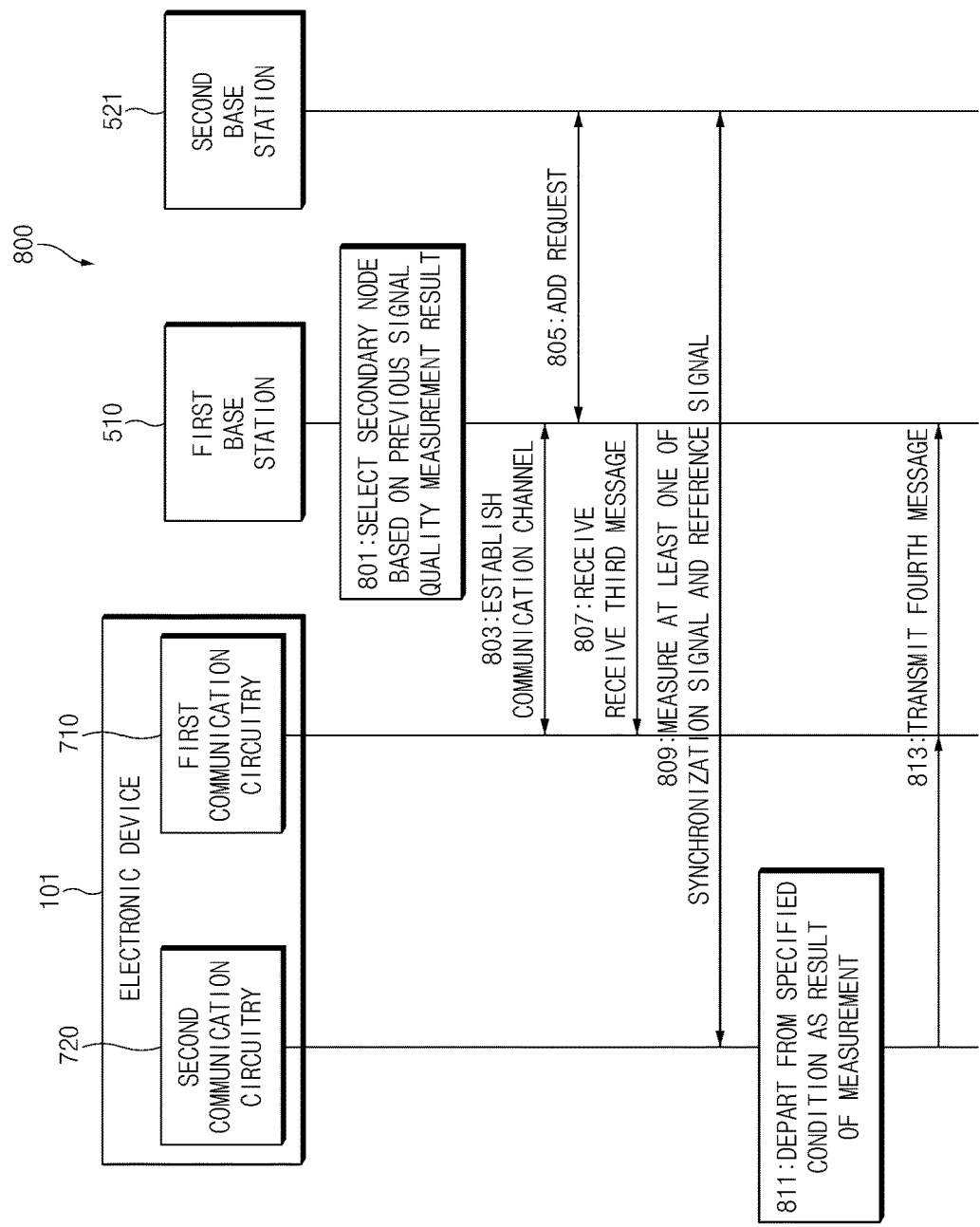
FIG. 8 is a signal sequence diagram illustrating an operation of measuring at least one of a synchronization signal and a reference signal transmitted from a second base station in an electronic device according to an embodiment.

FIG. 8 is a signal sequence diagram 800 illustrating an operation of measuring at least one of a synchronization signal and a reference signal transmitted by a second base station 521 in an electronic device 101 according to an embodiment.

In operation 801, a first base station 510 according to an embodiment may select a secondary node based on a previous signal quality measurement result. For example, the first base station 510 may establish a communication channel with an electronic device 101 prior to performing operation 801 and may select a secondary node based on information measured using second communication circuitry 720 by the electronic device 101.

In an embodiment, in operation 801, the first base station 510 may complete an operation of measuring signal quality with a plurality of nodes capable of becoming the secondary nodes and internally selecting the secondary node without receiving the measured information from the electronic device 101. For example, the first base station 510 may select a second base station 521 which meets a specified condition at a time when signal quality is measured as a secondary node to be additionally connected to the electronic device 101. For another example, the first base station 510 may be configured to select the second base station 521 among secondary nodes based on information about previously connected to the electronic device 101.

In operation 803, the electronic device 101 according to an embodiment may establish a communication channel with the first base station 510. Operation 803 may occur earlier than operation 801 and may occur later than operation 801. For example, when the first base station 510 selects the second base station 521 which meets a specified condition at a time when the first base station 510 measures a communication state as a secondary node to be added to the electronic device 101, operation 803 may occur earlier than operation 801. For another example, when selecting the second base station 521 based on the information about the secondary node previously connected to the electronic device 101, operation 803 may occur later than operation 801.

In operation 805, the first base station 510 according to an embodiment may transmit and receive an add request with the second base station 521 selected as the secondary node. The first base station 510 may transmit a signal requesting to add the electronic device 101 to the selected second base station 521. Receiving the request, the second base station 521 may transmit a response signal approving the request of the first base station 521 to the first base station 510.

In operation 807, the electronic device 101 according to an embodiment may receive a third message including information about the secondary node. For example, the first base station 510 may transmit a request to additionally connect the second base station 521 selected as the secondary node to the electronic device 101.

In operation 809, the electronic device 101 according to an embodiment may measure at least one of a synchronization signal and a reference signal transmitted from the second base station 521. The electronic device 101 may measure channel signal quality of the secondary node (e.g., the second base station 521) using at least one of the synchronization signal and the reference signal included in a measurement object. The electronic device 101 may measure at least one of the synchronization signal and the reference signal using frequency information associated with the secondary node selected by the first base station 510 and included in the third message and time information capable of attempting to perform a communication connection with the secondary node. The electronic device 101 may measure signal quality of the secondary node based on presence or absence of at least one of the synchronization signal and the reference signal, which meet a specified condition. According to various embodiments of the disclosure, the synchronization signal or the reference signal may be at least one of PSS, SSS, DMRS of PBCH, CRS, or CSI-RS transmitted by the second base station 521, when the second base station 521 is an LTE base station. According to another embodiment, the synchronization signal or the reference signal may be at least one of PSS of SS/PBCH block, SSS, DMRS of PBCH, or CSI-RS transmitted by the second base station 521, when the second base station 521 is an NR base station. The synchronization signal or the reference signal may operate as one or more sub-carrier spacings (SCSs) in one system. The SCS of the synchronization signal or the reference signal may vary with a setting of the base station. The SCS of the synchronization signal or the reference signal may operate as written in the specification. The SCS of the synchronization signal or the reference signal may vary with an operating frequency band. The SCS of the synchronization signal or the reference signal may be the same as an SCS of a data signal transmitted and received by the terminal.

In an embodiment, the electronic device 101 may perform discovery of at least one of the synchronization signal and the reference signal based on the third message including a setting associated with the second base station 521 selected as the secondary node from the first base station 510.

In an embodiment, the electronic device 101 may analyze at least one of the synchronization signal and the reference signal received from the selected second base station 521. The electronic device 101 may measure a direction of the beam or intensity of the beam from at least one of the synchronization signal and the reference signal using beam sweeping. For example, the electronic device 101 may perform sweeping for the entire beam making up at least one of the synchronization signal and the reference signal. For another example, the electronic device 101 may sweep a beam set which belongs to a specific time or a specific frequency interval to discover at least one of the synchronization signal and the reference signal.

According to an embodiment, the second base station 521 selected as the secondary node by the first base station 510 may be inappropriate for a communication environment of the electronic device 101. For example, when there is a change in a channel state of a time when the electronic device 101 receives the third message as compared with a channel state of a time when the first base station 510 selects a secondary node, the first base station 510 may select the second base station 521, to which the electronic device 101 is unable to be connected, as the secondary node. For another example, a location of the electronic device 101 at a time when the first base station 510 selects the secondary node may differ from a location of the electronic device 101 at a time when the electronic device 101 receives the third message.

In operation 811, the electronic device 101 according to an embodiment may determine that the measured result departs from a specified condition.

In an embodiment, when the result of measuring at least one of the synchronization signal and the reference signal does not meet the specified condition, the electronic device 101 may determine that the secondary node is inappropriate for being additionally connected to the electronic device 101. For example, when the electronic device 101 is located outside a cell range of the second base station 521 selected as the secondary node, it may determine that the selected second base station 521 is inappropriate for being added to the electronic device 101 because at least one of the synchronization signal and the reference signal is not discovered. For another example, the electronic device 101 may discover and find at least one of the synchronization signal and the reference signal, which have different physical cell IDs (PCIs). In this case, because at least one second base station obtained as a result of discovering at least one of the synchronization signal and the reference signal differs in PCI from the selected second base station 521, the electronic device 101 may determine that the selected second base station 521 is inappropriate for being added to the electronic device 101. For another example, when there is no resource capable of transmitting an RACH capable of being selected based on channel received power measured using at least one or more of a reference signal of the selected second base station 521, a synchronization signal of the selected base station 521, or a reference signal of the beam, the electronic device 101 may determine that information about the second base station 521 is inappropriate.

In an embodiment, when finding at least one of the synchronization signal and the reference signal using beam sweeping, the electronic device 101 may decode a PCI through a synchronization process. When the PC obtained by decoding the at least one of the synchronization signal and the reference signal differs from a PCI set in the electronic device 101, the electronic device 101 may determine that a setting associated with the secondary node included in the third message is inappropriate. For example, when not finding at least one of the synchronization signal and the reference signal using beam sweeping, the electronic device 101 may determine that a setting associated with the selected second base station 521 included in the received third message is inappropriate.

In operation 813, the electronic device 101 according to an embodiment may transmit a fourth message to the first base station 510. The electronic device 101 may transmit the fourth message to the first base station 510 using first communication circuitry 710 before the timer expires based on the result of measuring at least one of the synchronization signal and the reference signal received from the secondary node (e.g., the second base station 521) using the second communication circuitry 720. The fourth message may include whether it fails to add the secondary node. For example, the electronic device 101 may transmit the fourth message including information which fails to add the selected second base station 521 as a result of measuring at least one of the synchronization signal and the reference signal received from the second base station 521 selected as the secondary node.

In an embodiment, the electronic device 101 may transmit the fourth message including a report for failure to add the secondary node to the first base station 510. To quickly transmit the fourth message, the electronic device 101 may transmit the fourth message based on the result of determining the addition of the secondary node, before the timer expires. When it is determined that the information about the selected secondary node is inappropriate, the electronic device 101 may transmit information associated with signal quality about the selected secondary node or a secondary node meeting a specified condition, the information being included in the fourth message. For example, when it is determined that information about the selected second base station 521 included in the third message by the first base station 510 is inappropriate, the electronic device 101 may transmit the result of measuring a communication state of the selected second base station 521 and/or the adjacent second base station 522 or 523, the information being included in the fourth message.

In an embodiment, the fourth message may include information associated with the secondary node to which the electronic device 101 is previously connected. The electronic device 101 may store the measured result associated with the second base station 521 selected as the secondary node until the specified condition is met. The specified condition may include at least one or more of a cell range of the selected second base station 521, a frequency of the selected second base station 521, and/or a movement degree of the electronic device 101.

In an embodiment, when it is determined that it is inappropriate for being additionally connected with the secondary node included in the third message, the electronic device 101 may additionally measure a link associated with a cell and a frequency capable of being connected as the secondary node. For example, when the link result associated with a cell and a frequency of the selected second base station 521 is insufficient or invalid, the electronic device 101 may perform link measurement for a cell and a frequency of the adjacent second base station 522 or 523 or may search for a secondary node capable of being additionally connected with the electronic device 101. When the valid measurement result is obtained by measuring a link associated with a cell and a frequency of the second base station 522 or 523 or performing additional link measurement, the electronic device 101 may transmit information associated with the valid measurement result and a secondary node having the valid measurement result, the information being included in the fourth message, to the first base station 510.

Figure 9:
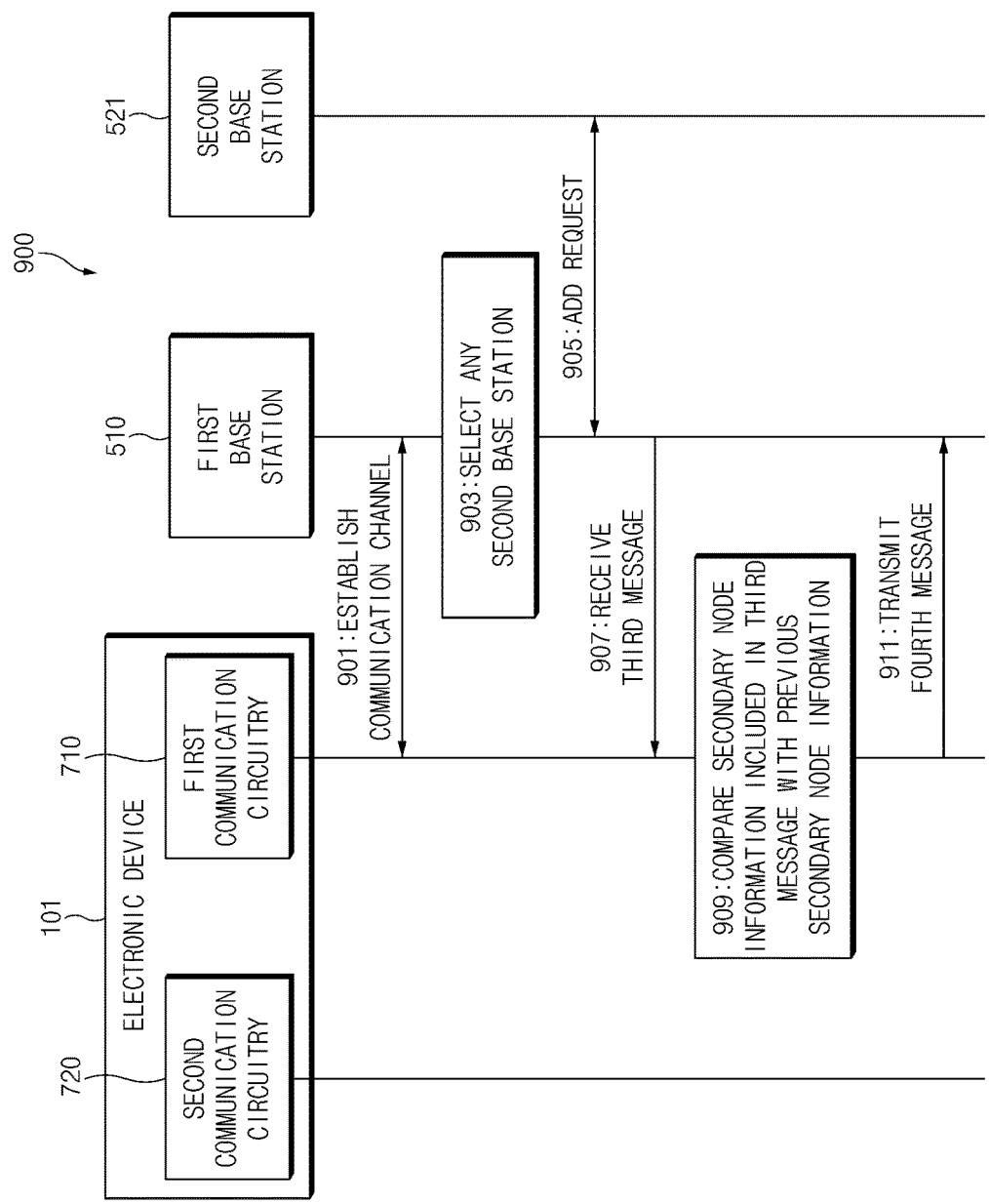
FIG. 9 is a signal sequence diagram illustrating an operation of comparing secondary node information included in a third message with received secondary node information in an electronic device according to an embodiment.

FIG. 9 is a signal sequence diagram 900 illustrating an operation of comparing secondary node information included in a third message with received secondary node information in an electronic device 101 according to an embodiment.

In operation 901, the electronic device 101 according to an embodiment may establish a communication channel with a first base station 510.

In operation 903, the first base station 510 according to an embodiment may select any second base station 521 as a secondary node. The first base station 510 may determine whether additionally connect any second base station 521 as the secondary node with the electronic device 101 depending on the result of measuring a previous communication state. For example, the first base station 510 may select any second base station 521 as the secondary node based on the result of measuring the previous channel state.

In operation 905, the first base station 510 according to an embodiment may transmit and receive an add request with the second base station 521. The first base station 510 may transmit a signal requesting to add the electronic device 101 to the second base station 521. The second base station 521 may transmit a response signal approving the request of the first base station 510 to the first base station 510.

In operation 907, the electronic device 101 according to an embodiment may receive a third message from the first base station 510. The first base station 510 may transmit a request to add the second base station 521 as the secondary node, included in the third message, to the electronic device 101 based on the result of measuring previous signal quality. For example, the first base station 510 may transmit secondary node information associated with the second base station 521 selected as the secondary node to the electronic device 101. When the communication state changes or the electronic device 101 moves as compared with a time when the secondary node is selected, the first base station 510 may transmit secondary node information including the secondary node to which the electronic device 101 is unable to be connected or in which the communication state is not good, the secondary node information being included in the third message, to the electronic device 101.

In operation 909, the electronic device 101 according to an embodiment may compare the secondary node information included in the third message with previous secondary node information.

In an embodiment, the previous secondary node information may include previous secondary node related information. The electronic device 101 may store the previous secondary node related information. The previous secondary node related information may include cell information associated with at least one second base station 521 to which the electronic device 101 was connected in the past, measurement object information, and/or link measurement result information. The cell information associated with the at least one second base station 521 may include frequency information, time information, and/or PCI information of at least one of a synchronization signal and a reference signal. The electronic device 101 may store the previous secondary node related information in a database (DB). As an embodiment, it is possible for the previous secondary node related information to be stored in a memory 130 of the electronic device 101. As another embodiment, the previous secondary node related information may be stored in at least one of first communication circuitry 710 or secondary communication circuitry 720.

In an embodiment, the electronic device 101 may compare the previous secondary node related information with a secondary node setting value included in the third message received from the first base station 510. For example, the electronic device 101 may compare frequency information or a PCI of at least one of the synchronization signal or the reference signal included in the secondary node setting value included in the third message with frequency information or a PCI of at least one of a synchronization signal or a reference signal of the previous secondary node related information stored in the electronic device 101. When the previous secondary node related information differs from the secondary node setting value included in the third message received from the first base station 510, the electronic device 101 may determine that the secondary node setting value included in the third message is inappropriate. As an embodiment, as shown in FIG. 9, it is possible for the first communication circuitry 710 to perform the process of comparing the previous secondary node related information with the secondary node setting value included in the third message received from the first base station 510. As another embodiment, it is possible for the second communication circuitry 720 to perform the process of comparing the previous secondary node related information with the secondary node setting value included in the third message received from the first base station 510.

In operation 911, the electronic device 101 according to an embodiment may transmit a fourth message to the first base station 510 via the first communication circuitry 710. When determining that the secondary node setting value is inappropriate, the electronic device 101 may transmit the fourth message. For example, the fourth message may include a secondary node failure message. The electronic device 101 may transmit the fourth message without a separate synchronization operation such as discovery of at least one of the synchronization signal or the reference signal.

In an embodiment, the electronic device 101 may transmit the previous secondary node related information, included in the fourth message, to the first base station 510. When receiving the third message requesting to add any second base station 521 as the secondary node from the first base station 510, the electronic device 101 may immediately transmit the fourth message to the first base station 510. The electronic device 101 may allow the first base station 510 to select a new secondary node suitable for being added to the electronic device 101 using the previous secondary node related information included in the fourth message.

In an embodiment, the electronic device 101 may transmit the result of measuring a communication state of a secondary node desired to be additionally connected, included in the fourth message, to the first base station 510. For example, when receiving the third message from the first base station 510, the electronic device 101 may fail to measure a communication state for the second base station 521 specified as the secondary node by the first base station 510 and may transmit the result of measuring the communication state of the second base station 522 or 523 desired to be additionally connected, included in the fourth message, to the first base station 510 based on the previous secondary node related information. The electronic device 101 may allow the first base station 510 to select the second base station 522 or 523 to be additionally connected to the electronic device 101 as the secondary node.

Figure 10:
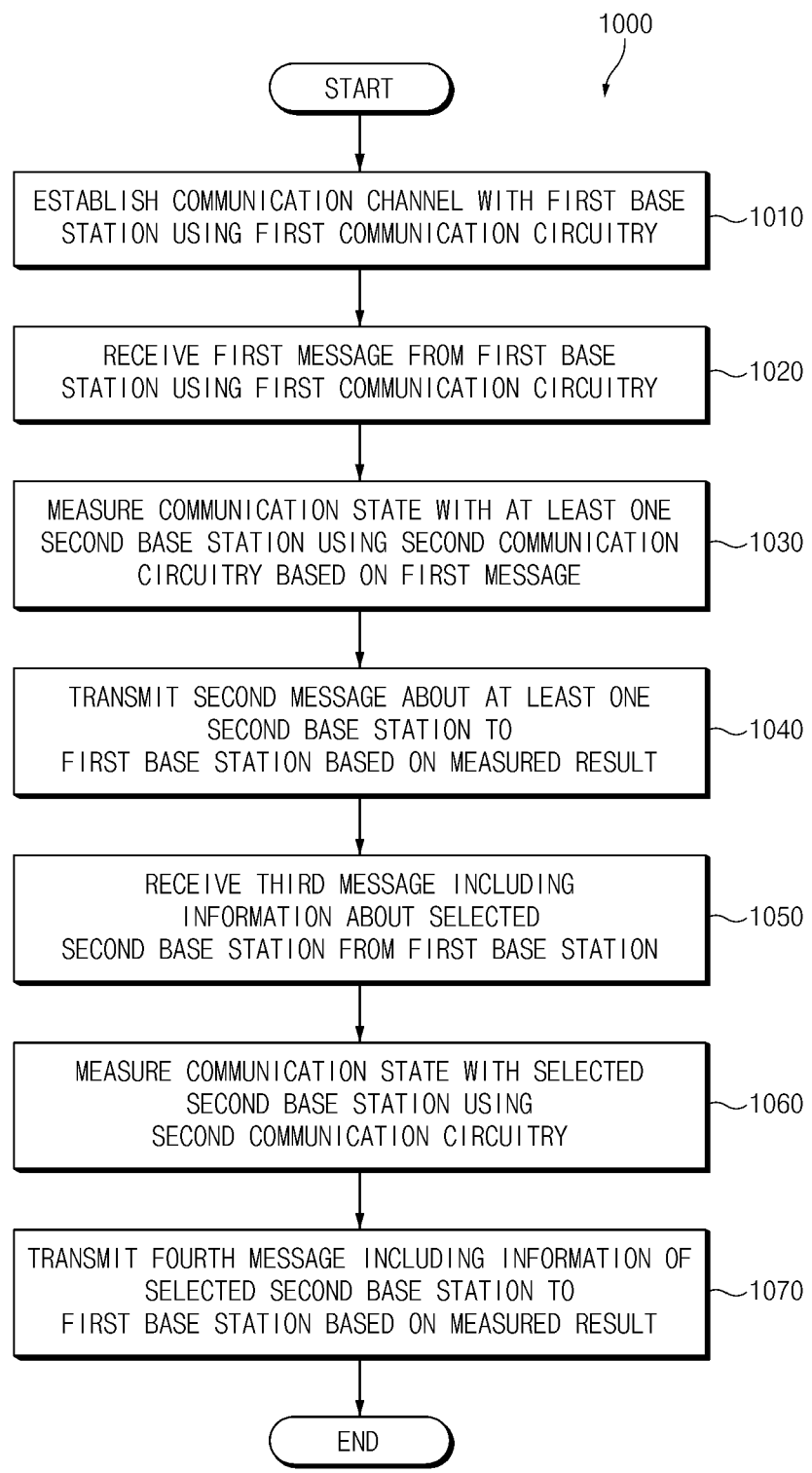
FIG. 10 is a flowchart illustrating an operation method of an electronic device according to an embodiment.

FIG. 10 is a flowchart 1000 illustrating an operation method of an electronic device 101 according to an embodiment.

In operation 1010, the electronic device 101 according to an embodiment may establish a communication channel with a first base station 510 using first communication circuitry 710. The electronic device 101 may complete access to the first base station 510.

In operation 1020, the electronic device 101 according to an embodiment may receive a first message from the first base station 510 using the first communication circuitry 710. The electronic device 101 may prepare for being additionally connected with at least one second base station 521, 522, or 523 which uses a frequency band or an RAT different from the first base station 510 to support multi-connectivity (e.g., dual connectivity) among base stations which use different frequency bands or different RATs.

In operation 1030, the electronic device 101 according to an embodiment may measure signal quality of at least one second base station 521, 522, or 523 using second communication circuitry 720 based on the first message.

In operation 1040, the electronic device 101 according to an embodiment may transmit a second message about at least one second base station 521, 522, or 523 to the first base station 510 using the first communication circuitry 710 based on the measured result. The electronic device 101 may notify the first base station 510 of the signal quality of the at least one second base station 521, 522, or 523.

In an embodiment, the first base station 510 may select any one of the at least one second base station 521, 522, or 523 based on the second message. The first base station 510 may transmit a secondary node addition request to the selected second base station 521. The first base station 510 may receive a response to the secondary node addition request from the selected second base station 521.

In operation 1050, the electronic device 101 according to an embodiment may receive a third message including information for adding the selected second base station 521 as a secondary node from the first base station 510. The third message may include configuration information causing the electronic device 101 to access the selected second base station 521. For example, the configuration information included in the third message may be a PCI and/or access information included in at least one of a synchronization signal and a reference signal of the second base station 521 selected as the secondary node. For another example, the configuration information included in the third message may be timer information for measuring a limited time when it is connectable with the second base station 521 selected as the secondary node. For another example, the configuration information included in the third message may be information about a communication environment condition capable of being selected as the secondary node.

In operation 1060, the electronic device 101 according to an embodiment may measure a channel state with the selected second base station 521 using the second communication circuitry 720. The electronic device 101 may determine whether information about the selected second base station 521 is appropriate before the timer expires.

In an embodiment, the electronic device 101 may determine a channel state with the selected second base station 521 by at least one of the synchronization signal and the reference signal, a PCI, and/or reference signal received power of the beam.

In an embodiment, when the reference signal received power of the beam updated through the measurement does not meet a specified condition, the electronic device 101 may determine that information about the selected second base station 521 is inappropriate. For example, when the reference signal received power of the beam of another second base station 522 or 523 is higher over a certain value than the reference signal received power of the beam of the selected second base station 521, the electronic device 101 may determine that the information about the selected second base station 521 is inappropriate. For another example, when the reference signal received power of the beam of the selected second base station 521 is less than or equal to a specified value, the electronic device 101 may determine that the information about the selected second base station 521 is inappropriate. For another example, when there is no resource capable of transmitting an RACH capable of being selected based on channel received power measured using at least one or more of a reference signal of the selected second base station 521, a synchronization signal of the selected base station 521, or a reference signal of the beam, the electronic device 101 may determine that the information about the second base station 521 is inappropriate.

In operation 1070, the electronic device 101 according to an embodiment may transmit a fourth message including information of the selected second base station 521 to the first base station 510 based on the measured result. When the information about the selected base station 521 is inappropriate, the electronic device 101 may transmit the fourth message before the timer expires.

In an embodiment, when the information about the selected base station 521 is inappropriate, the electronic device 101 may transmit the fourth message before the timer expires. The electronic device 101 may transmit secondary node addition failure information and/or information associated with the result of measuring the channel state with the at least one second base station 521, 522, or 523, included in the fourth message, to the first base station 510.

In an embodiment, the electronic device 101 may transmit a request for adding the second base station 522 or 523, which meets a specified channel by reflecting movement of the electronic device 101 or a change situation of the channel, as the secondary node to the first base station 510. The electronic device 101 according to an embodiment may transmit the fourth message including a request for adding the second base station 522 or 523 as the secondary node to the first base station 510 or may report failure, before the timer expires. The electronic device 101 according to an embodiment may connect the second base station 522 or 523 to the secondary node quicker than when transmitting the fourth message or reporting the failure after the timer expires.

The electronic device 101 according to various embodiments may include a first communication circuitry 710 configured to provide first wireless communication using a first frequency range, a second communication circuitry 720 configured to provide second wireless communication using a second frequency range, a processor 120 operatively connected with the first communication circuitry 710 and the second communication circuitry 720, and a memory 130 operatively connected with the processor 120. The memory 130 may store instructions, when executed, causing the processor 120 to establish a communication channel with a first base station 510, using the first communication circuitry 710, receive a first message including at least one frequency information to measure a communication state using the first communication circuitry 710, from the first base station 510, measure a communication state with at least one second base station 521, 522, or 523, using the second communication circuitry 720 based on the first message, transmit a second message about the at least one second base station 521, 522, or 523 to the first base station 510, based on the measured result, receive a third message including information about a selected second base station 521 and timer information, based on the second message from the first base station 510, start to run a timer based on the timer information and measure a channel state with the selected second base station 521, based on a signal received from the selected second base station 521, using the second communication circuitry 720, and transmit a fourth message including the information of the selected second base station 521 to the first base station 510, before the timer expires, based on the measured result.

In an embodiment, the timer may include time information where the electronic device 101 is able to attempt to perform a communication connection with the selected second base station 521.

In an embodiment, the instructions may cause the processor 120 to measure a channel state with at least one third base station, using the second communication circuitry 720 based on the measured result and include the result of measuring the communication state with the at least one third base station in the fourth message.

In an embodiment, the instructions may cause the processor 120 to receive a fifth message including information of one third base station selected among the at least one third base station from the first base station 510 and perform a communication connection with the selected one third base station, using the second communication circuitry 720 based on the fifth message.

In an embodiment, the instructions may cause the processor 120 to operate according to the 3rd generation partnership project (3GPP) standard. The first base station 510 may be included in a master cell group (MCG), and the second base station 521, 522, or 523 and the third base station may be included in a secondary node (SN). The first message may include a radio resource control (RRC) connection reconfiguration message, the second message may include a measurement report, the third message may include a secondary node addition configuration message, and the fourth message may include secondary node addition failure information.

In an embodiment, the MCG may include a 4G or long term evolution (LTE) base station, and the secondary node may include a 5G or new radio (NR) base station.

In an embodiment, the instructions may cause the processor 120 to transmit the second message to the first base station 510, using the first communication circuitry 710, and detect movement of the electronic device 101, and transmit the fourth message to the first base station 510, before the timer expires, based on the detected result.

In an embodiment, the instructions may cause the processor 120 to transmit the fourth message to the first base station 510, before the timer expires, when the information about the selected second base station 521 in the third message does not meet a specified condition.

An electronic device 101 according to various embodiments may include a first communication circuitry 710 configured to provide first wireless communication using a first frequency range, a second communication circuitry 720 configured to provide second wireless communication using a second frequency range, a processor 120 operatively connected with the first communication circuitry 710 and the second communication circuitry 720, and a memory 130 operatively connected with the processor 120. The memory 130 may store instructions, when executed, causing the processor 120 to establish a communication channel with the first base station 510 using the first communication circuitry 710, receive a secondary node addition configuration message including information about a second base station 521 requested to be added by the first base station 510 and timer information from the first base station 510, start to run a timer based on the timer information and measure a channel state with the second base station 521 based on a signal received from the second base station 521, using the second communication circuitry 720, and compare the measured result with the secondary node addition configuration message and transmit a secondary node addition failure message including information that it fails to add the second base station 521 to the first base station 510, using the first communication circuitry 710, before the timer expires.

In an embodiment, the instructions may cause the processor 120 to discover at least one of a synchronization signal or a reference signal, using the second communication circuitry 720 based on the secondary node addition configuration message and transmit a secondary node addition failure message including information associated with a reason for secondary node addition failure of the second base station 521 to the first base station 510, using the first communication circuitry 710, before the timer expires, based on the discovered result.

In an embodiment, the instructions may cause the processor 120 to determine whether at least one of the synchronization signal or the reference signal is not discovered as a result of the discovery or whether a physical cell ID (PCI) included in at least one of the synchronization signal or the reference signal differs from a PCI stored during a specified period in the electronic device 101 and transmit the secondary node addition failure message to the first base station 510, before the timer expires, based on the determined result.

In an embodiment, the memory 130 may store a list including information about at least one second base station 521, 522, or 523, the information being stored during a specified period. The instructions may cause the processor 120 to determine whether information about a selected second base station 521 is included in the list and transmit the secondary node addition failure message before measuring a communication state with the selected second base station 521, based on the determined result.

In an embodiment, the list may include frequency information of at least one of a synchronization signal or a reference signal of the at least one second base station 521, 522, or 523 being previously accessed, time information where the electronic device 101 attempts to perform a communication connection with the at least one second base station 521, 522, or 523, or PCI information of the at least one second base station 521, 522, or 523.

In an embodiment, the instructions may cause the processor 120 to transmit information about a second base station 522 or 523 meeting the communication state among the at least one second base station 521, 522, or 523, the information being included in the secondary node addition failure message.

In an embodiment, the measured result may include a link measurement result including movement information of the electronic device 101, the movement information being stored during a specified period, and time information where the electronic device 101 attempts to perform a communication connection with the at least one second base station 521, 522, or 523. The instructions may cause the processor 120 to transmit the measured result, included in the secondary node addition failure message.

A driving method of an electronic device 101 according to various embodiments may include establishing (operation 1010) a communication channel with a first base station 510, using a first communication circuitry 710 configured to provide first wireless communication using a first frequency range, receiving (operation 1020) a first message including at least one frequency information to measure a communication state using a second communication circuitry 720, from the first base station 510 using the first communication circuitry 710, measuring (operation 1030) a communication state with at least one second base station 521, 522, or 523, using the second communication circuitry 720 configured to provide second wireless communication using a second frequency range based on the first message, transmitting (operation 1040) a second message about the at least one second base station 521, 522, or 523 to the first base station 510, based on the measured result, receiving (operation 1050) a third message including information about a selected second base station 521 and timer information, based on the second message from the first base station 510, starting (operation 1060) to run a timer based on the timer information and measuring a communication state with the selected second base station 521, based on a signal received from the selected second base station 521, using the second communication circuitry 720, and transmitting (operation 1070) a fourth message including the information of the selected second base station 521 to the first base station 510, before the timer expires, based on the measured result.

In an embodiment, the measured result may include reference signal received power (RSRP) of a beam based on at least one of a synchronization signal or a reference signal.

In an embodiment, when at least one of the synchronization signal or the reference signal is not discovered as a result of the discovery or when a physical cell ID (PCI) included in at least one of the synchronization signal or the reference signal differs from a PCI stored during a specified period in the electronic device 101, secondary node addition failure information may be transmitted to the first base station 510, the secondary node addition failure information being included in the fourth message, before the timer expires.

In an embodiment, when beam reference signal received power of a second base station 522 or 523 except for the selected second base station 521 among the at least one second base station 521, 522, or 523 is better as a result of the measurement or when beam reference signal received power of the selected second base station 521 is less than or equal to a specified criterion, a fourth message including the measured result may be transmitted to the first base station 510, before the timer expires.

In an embodiment, when beam reference signal received power of a second base station 522 or 523 except for the selected second base station 521 among the at least one second base station 521, 522, or 523 is better as a result of the measurement, information about the second base station 522 or 523 having the better beam reference signal received power may be included in the fourth message.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first communication circuitry configured to provide first wireless communication using a first frequency range;
a second communication circuitry configured to provide second wireless communication using a second frequency range;
a processor operatively connected with the first communication circuitry and the second communication circuitry; and
a memory operatively connected with the processor,
wherein the memory stores instructions, when executed, causing the processor to:
establish a communication channel with a first base station, using the first communication circuitry;
receive a first message including at least one frequency information to measure a communication state using the second communication circuitry, from the first base station;
measure a communication state with at least one second base station, using the second communication circuitry based on the first message;
transmit a second message about the at least one second base station to the first base station, based on the measured result;
receive a third message including information about a selected second base station and timer information, based on the second message from the first base station;
start to run a timer based on the timer information and measure a channel state with the selected second base station, based on a signal received from the selected second base station, using the second communication circuitry; and
transmit a fourth message including the information of the selected second base station to the first base station, before the timer expires, based on the measured result,
wherein the timer includes time information where the electronic device is able to attempt to perform a communication connection with the selected second base station.

2. The electronic device of claim 1, wherein the instructions cause the processor to:
measure a communication state with at least one third base station, using the second communication circuitry based on the measured result; and
include the result of measuring the communication state with the at least one third base station in the fourth message.

3. The electronic device of claim 2, wherein the instructions cause the processor to:
receive a fifth message including information of a third base station selected among the at least one third base station from the first base station; and
perform a communication connection with the selected third base station, using the second communication circuitry based on the fifth message.

4. The electronic device of claim 3, wherein the instructions cause the processor to operate according to the 3rd generation partnership project (3GPP) standard,
wherein the first base station is included in a master cell group (MCG),
wherein the second base station and the third base station are included in a secondary node (SN),
wherein the first message includes a radio resource control (RRC) connection reconfiguration message,
wherein the second message includes a measurement report,
wherein the third message includes a secondary node addition configuration message, and
wherein the fourth message includes secondary node addition failure information.

5. The electronic device of claim 4, wherein the MCG includes a 4G or long-term evolution (LTE) base station, and
wherein the secondary node includes a 5G or new radio (NR) base station.

6. The electronic device of claim 1, wherein the instructions cause the processor to:
transmit the second message to the first base station, using the first communication circuitry, and detect movement of the electronic device; and
transmit the fourth message to the first base station, before the timer expires, based on the detected result.

7. The electronic device of claim 1, wherein the instructions cause the processor to:
transmit the fourth message to the first base station, before the timer expires, when the information about the selected second base station in the third message does not meet a specified condition.

8. An electronic device, comprising:
a first communication circuitry configured to provide first wireless communication using a first frequency range;
a second communication circuitry configured to provide second wireless communication using a second frequency range;
a processor operatively connected with the first communication circuitry and the second communication circuitry; and
a memory operatively connected with the processor,
wherein the memory stores instructions, when executed, causing the processor to:
establish a communication channel with a first base station, using the first communication circuitry;
receive a secondary node addition configuration message including information about a second base station to be requested to be added by the first base station and timer information from the first base station;
start to run a timer based on the timer information and measure a communication state with the second base station, based on a signal received from the second base station, using the second communication circuitry; and
compare the measured result with the secondary node addition configuration message and transmit a secondary node addition failure message including information that it fails to add the second base station to the first base station, using the first communication circuitry, before the timer expires,
wherein the timer includes time information where the electronic device is able to attempt to perform a communication connection with the selected second base station.

9. The electronic device of claim 8, wherein the instructions cause the processor to:
discover at least one of a synchronization signal or a reference signal, using the second communication circuitry based on the secondary node addition configuration message; and
transmit a secondary node addition failure message including information associated with a reason for secondary node addition failure of the second base station to the first base station, using the first communication circuitry, before the timer expires, based on the discovered result.

10. The electronic device of claim 9, wherein the instructions cause the processor to:
  determine whether at least one of the synchronization signal or the reference signal is not discovered as a result of the discovery or whether a physical cell ID (PCI) included in at least one of the synchronization signal or the reference signal differs from a PCI stored during a specified period in the electronic device; and
  transmit the secondary node addition failure message to the first base station, before the timer expires, based on the determined result.

11. The electronic device of claim 8, wherein the memory stores a list including information about at least one second base station, the information being stored during a specified period,
  wherein the instructions cause the processor to:
  determine whether information about the second base station is included in the list; and
  transmit the secondary node addition failure message before measuring a communication state with the second base station, based on the determined result.

12. The electronic device of claim 11, wherein the list includes frequency information of at least one of a synchronization signal or a reference signal of the at least one second base station being previously accessed, time information where the electronic device attempts to perform a communication connection with the at least one second base station, or PCI information of the at least one second base station.

13. The electronic device of claim 8, wherein the instructions cause the processor to:
  transmit information about the second base station, the information being included in the secondary node addition failure message.

14. The electronic device of claim 11, wherein the measured result includes a link measurement result including movement information of the electronic device, the movement information being stored during a specified period, and time information where the electronic device attempts to perform a communication connection with the at least one second base station, and
  wherein the instructions cause the processor to:
  transmit the measured result, included in the secondary node addition failure message.

* * * * *